(12) United States Patent
Lyden

(10) Patent No.: US 10,507,385 B2
(45) Date of Patent: Dec. 17, 2019

(54) GAME CONTROLLER

(71) Applicant: Kieran S. Lyden, Portland, OR (US)

(72) Inventor: Kieran S. Lyden, Portland, OR (US)

( * ) Notice: Subject to any disclaimer, the term of this patent is extended or adjusted under 35 U.S.C. 154(b) by 303 days.

(21) Appl. No.: 15/415,728

(22) Filed: Jan. 25, 2017

(65) Prior Publication Data

US 2018/0207523 A1    Jul. 26, 2018

(51) Int. Cl.
| | |
|---|---|
| *G09G 5/00* | (2006.01) |
| *A63F 13/24* | (2014.01) |
| *A63F 13/214* | (2014.01) |
| *A63F 13/235* | (2014.01) |

(52) U.S. Cl.
CPC ............ *A63F 13/24* (2014.09); *A63F 13/214* (2014.09); *A63F 13/235* (2014.09)

(58) Field of Classification Search
None
See application file for complete search history.

(56) References Cited

U.S. PATENT DOCUMENTS

| | | | |
|---|---|---|---|
| 4,508,942 A | 4/1985 | Inaba | |
| 5,716,274 A | 2/1998 | Goto et al. | |
| 5,984,548 A * | 11/1999 | Willner | G06F 3/0219 |
| | | | 348/E5.103 |
| 6,019,680 A * | 2/2000 | Cheng | A63F 13/06 |
| | | | 463/37 |
| 6,135,886 A | 10/2000 | Armstrong | |
| 6,256,013 B1 | 7/2001 | Siddiqui | |
| 6,313,826 B1 | 11/2001 | Schrum et al. | |
| 6,489,946 B1 | 12/2002 | Takeda et al. | |
| 6,512,511 B2 * | 1/2003 | Willner | A63F 13/06 |
| | | | 345/169 |
| 6,933,925 B1 | 8/2005 | Gibbons et al. | |
| 7,205,980 B2 | 4/2007 | Maroun | |
| 7,345,674 B2 | 3/2008 | McLoone et al. | |

(Continued)

OTHER PUBLICATIONS

Microsoft Xbox Elite One game controller product information from the www.xbox.com website, published in 2016, pp. 1-11, and downloaded on Jan. 7, 2017.

(Continued)

*Primary Examiner* — Sunit Pandya
(74) *Attorney, Agent, or Firm* — Westman, Champlin & Koehler, P.A.

(57) ABSTRACT

The invention relates to a game controller for controlling the play of computerized games, more particularly, but not exclusively, the invention relates to ergonomics and control systems which can be programmed and customized. A game controller can include removable and replaceable ergonomic grips to accommodate and fit users having small, medium, and large hand sizes. Further, a game controller can include a removable and replaceable gate which can be circular, octagonal, square, diamond, or other geometric shape for customizing the play of at least one joystick or thumbstick control. In addition, a game controller can include customizable paddle controls mounted on the bottom side of the handle portions of the game controller. Alternatively, a game controller can include a plurality of control keys, or touch pad controls mounted on the bottom side of the handle portions. Moreover, a game controller can include touch pad controls for a majority and/or all of the various desired operations and functions of the device.

17 Claims, 20 Drawing Sheets

(56) References Cited

U.S. PATENT DOCUMENTS

| | | | |
|---|---|---|---|
| D572,254 S | 7/2008 | Goto | |
| D608,784 S | 1/2010 | Biheller | |
| 7,656,389 B2 | 2/2010 | Adan et al. | |
| 7,659,887 B2 | 2/2010 | Larsen et al. | |
| 7,813,774 B2 | 10/2010 | Perez-Noguera | |
| 7,880,727 B2 | 2/2011 | Abanami et al. | |
| 7,939,774 B2 | 5/2011 | Corcoran et al. | |
| 7,948,474 B2 | 5/2011 | Chatterjee et al. | |
| 7,995,035 B2 | 8/2011 | Wu | |
| D667,892 S | 9/2012 | Burgess et al. | |
| 8,409,002 B2 | 4/2013 | Evans et al. | |
| 8,480,491 B2 | 7/2013 | Burgess et al. | |
| 8,547,334 B2 | 10/2013 | Min-Liang et al. | |
| 8,581,852 B2 | 11/2013 | Izadi et al. | |
| 8,613,665 B2 | 12/2013 | Goto et al. | |
| 8,641,525 B2 | 2/2014 | Burgess et al. | |
| 8,648,822 B2 | 2/2014 | Weiss | |
| 8,665,244 B2 | 3/2014 | Large et al. | |
| 8,715,080 B2 | 5/2014 | Yasuda et al. | |
| 8,727,882 B2 | 5/2014 | Lum et al. | |
| 8,749,489 B2 | 6/2014 | Ito et al. | |
| 8,754,855 B2 | 6/2014 | Duncan et al. | |
| D709,882 S | 7/2014 | Morris et al. | |
| D715,296 S | 10/2014 | Huang | |
| 8,884,907 B2 | 11/2014 | Townsend et al. | |
| 8,913,019 B2 | 12/2014 | Zhao et al. | |
| D721,139 S | 1/2015 | Burgess et al. | |
| 8,933,912 B2 | 1/2015 | Ambrus et al. | |
| 8,982,051 B2 | 3/2015 | Rosenfeld et al. | |
| D728,030 S | 4/2015 | Burgess et al. | |
| 9,005,025 B2 | 4/2015 | Joynes et al. | |
| D730,451 S | 5/2015 | Burgess: et al. | |
| 9,029,721 B2 | 5/2015 | Ikeda et al. | |
| D733,802 S | 7/2015 | Burgess et al. | |
| 9,089,770 B2 | 7/2015 | Burgess et al. | |
| 9,098,117 B2 | 8/2015 | Lutz et al. | |
| 9,116,555 B2 | 8/2015 | Nakayama et al. | |
| 9,152,288 B2 | 10/2015 | Dietz | |
| 9,174,122 B2 | 11/2015 | Miyazaki | |
| 9,174,124 B2 | 11/2015 | Hammontree et al. | |
| 9,223,471 B2 | 12/2015 | Buxton et al. | |
| 9,227,141 B2 | 1/2016 | Mays, III et al. | |
| D748,734 S | 2/2016 | Burgess et al. | |
| 9,250,753 B2 | 2/2016 | Westhues et al. | |
| 9,251,701 B2 | 2/2016 | Plagge et al. | |
| 9,285,907 B2 | 3/2016 | Weiss et al. | |
| 9,289,688 B2 * | 3/2016 | Burgess | A63F 13/20 |
| 9,308,450 B2 | 4/2016 | Burgess et al. | |
| 9,308,451 B2 | 4/2016 | Burgess et al. | |
| 9,335,900 B2 | 5/2016 | Weiss | |
| 9,352,229 B2 | 5/2016 | Burgess et al. | |
| 9,354,804 B2 | 5/2016 | Berkes et al. | |
| 9,372,588 B2 | 6/2016 | Dietz et al. | |
| 9,377,646 B2 | 6/2016 | Westhues et al. | |
| 9,381,435 B2 | 7/2016 | Nakayama et al. | |
| 9,436,338 B2 | 9/2016 | Keller et al. | |
| D772,988 S | 11/2016 | Kujawski et al. | |
| 9,492,744 B2 | 11/2016 | Burgess et al. | |
| 9,501,218 B2 | 11/2016 | Hwang et al. | |
| 9,504,911 B2 | 11/2016 | Hackney | |
| 9,517,407 B2 | 12/2016 | Yasuda et al. | |
| 9,519,419 B2 | 12/2016 | Hinckley et al. | |
| 9,526,986 B2 | 12/2016 | Tanaka et al. | |
| 9,526,987 B2 | 12/2016 | Horita et al. | |
| 2006/0040740 A1 * | 2/2006 | DiDato | A63F 13/06 463/37 |
| 2007/0078002 A1 | 4/2007 | Evans et al. | |
| 2009/0146958 A1 | 6/2009 | Ikeda et al. | |
| 2010/0178984 A1 | 7/2010 | Lum et al. | |
| 2010/0222146 A1 | 9/2010 | Evans et al. | |
| 2012/0007822 A1 * | 1/2012 | Luo | G06F 3/041 345/173 |
| 2013/0053146 A1 | 2/2013 | Ikeda et al. | |
| 2013/0215081 A1 * | 8/2013 | Levin | G06F 1/1626 345/174 |
| 2014/0078086 A1 * | 3/2014 | Bledsoe | G06F 3/041 345/173 |
| 2016/0082349 A1 | 3/2016 | Burgess et al. | |
| 2016/0232675 A1 | 8/2016 | Ogasawara et al. | |
| 2016/0296837 A1 | 10/2016 | Burgess et al. | |
| 2016/0317925 A1 | 11/2016 | Miller | |
| 2016/0346682 A1 | 12/2016 | Burgess et al. | |
| 2016/0361639 A1 | 12/2016 | Schmitz et al. | |

OTHER PUBLICATIONS

Sony DualShock PS4 fame controller product information from the www.playstation.com website, published in 2015, pp. 1-4, and downloaded on Jan. 7, 2017.

"Sony Announces 2 Licensed 'Elite' PS4 Controllers From Raser, Naon," by Ken Salcedo, www.ibtimes.com website, published Oct. 26, 2016, 3 pages, downloaded Jan. 7, 2017.

Razer Raijugame controller product information from the www.razerzone.com website, published in 2016, pp. 1-7, downloaded on Jan. 7, 2017.

Nacon Revolution game controller product information from the nacongamin.com website, published in 2016, pp. 1-12, downloaded Jan. 7, 2017.

"How to make the most of the Steam Controller: A comprehensive guide," by Kevin Connolly, www.pcgamer.com website, Apr. 15, 2016, pp. 1-5, downloaded Jan. 7, 2017.

"New DualShock 4 Controller Patented by Sony," from www.neogaf.com website, published on Jun. 19, 2016, pp. 1-7, downloaded on Jan. 7, 2017.

* cited by examiner

GAME CONTROLLER

FIELD

The invention relates to game controllers for controlling the play of computerized games, more particularly, but not exclusively, the invention relates to ergonomics and a control system which can be programmed and customized.

BACKGROUND OF THE INVENTION

Many different types of gaming consoles and game controllers are presently available for operating video games. For example, the Sony Corporation has made the Playstation® gaming console, and the DualShock® 1-4 game controllers, and has been granted U.S. Pat. No. 5,716,274, by Goto et al., U.S. Pat. No. 8,613,665 B2 by Goto et al., U.S. Pat. No. 9,115,555 B2 by Nakayama et al., U.S. Pat. No. 9,174,122 B2 by Miyakazi, U.S. Pat. No. 9,381,435 B2 by Nakayama et al., U.S. D572,254 S by Goto, and U.S. D715,296 S by Huang for game controllers, all of these patents hereby being incorporated by reference herein. In this regard, U.S. D715,296 S by Huang closely corresponds to the Sony® PS4 game controller. The Razer Raiju Gaming Controller and Nacon Revolution Pro Controller are also two officially licensed controllers for the Sony® PS4 in 2016. The Microsoft Corporation has made the Xbox® gaming console and the Xbox® Duke game controller, the Xbox 360® game console and controllers, and most recently the Xbox One® game console and controller and also the Xbox One Elite® game controller, and has been granted U.S. Pat. No. 8,409,002 B2 by Evans et al., U.S. Pat. No. 8,727,882 B2 by Lum et al., U.S. Pat. No. 9,029,721 B2 by Ikeda et al., U.S. Pat. No. 9,251,701 B2 by Plagge et al., U.S. Pat. No. 9,227,141 B2 by Mays III et al., U.S. D709,882 S by Morris et al., U.S. D772,988 S by Kujawski et al., and has also filed published U.S. patent applications U.S. 20130053146 A1 by Ikeda et al., but also U.S. 20160361639 A1 by Schmitz et al., U.S. 20160317925 A1 by Miller, U.S. 20100222146 A1 by Evans et al., U.S. 20100178984 A1 by Lum et al., U.S. 20090146958 A1 by Ikeda et al., and U.S. 20070078002 A1 by Evans et al., all of these patents and patent applications hereby being incorporated by reference herein. In this regard, U.S. D709,882 S by Morris et al. closely corresponds to the Xbox One® game controller, and U.S. D772,988 S by Kujawski et al. closely corresponds to the Xbox One Elite® game controller. Nintendo® has made the Nintendo Entertainment System®, the Super Nintendo Entertainment System®, Nintendo 64®, Nintendo GameCube®, and the Wii® and the Wii U® gaming consoles and each console's respective controllers, and has also been granted U.S. Pat. No. 6,489,946 B1 by Takeda et al., U.S. Pat. No. 8,715,080 B2 by Yasuda et al., U.S. Pat. No. 8,749,489 B2 by Ito et al., U.S. Pat. No. 9,517,407 B2 by Yasuda et al., U.S. Pat. No. 9,526,986 B2 by Tanaka et al., U.S. Pat. No. 9,526,987 B2 by Horita et al., and has also filed for published U.S. patent application U.S. 20160232675 A1, all of these patents and this patent application hereby being incorporated by reference herein. There are also many other designers and/or manufacturers of game controllers which are compatible with different gaming consoles and systems and some of these are also associated with patents such as U.S. Pat. No. 9,005,025 B2 by Joynes et al. assigned to Wikipad, Inc., U.S. Pat. No. 9,504,911 B2 by Hackney assigned to Cinch Gaming Equipment LLC, and U.S. D608,784 S by Biheller, assigned to Dreamgear LLC, all of these patents hereby being incorporated by reference herein. In particular, Scuf Gaming International LLC has commercialized game controllers including paddle controls and is associated with numerous patents and patent applications by Burgess et al. assigned to Ironburg Inventions Ltd. including U.S. Pat. No. 8,480,491 B2, U.S. Pat. No. 8,641,525 B2, U.S. Pat. No. 9,089,770 B2, U.S. Pat. No. 9,289,688 B2, U.S. Pat. No. 9,308,450 B2, U.S. Pat. No. 9,308,451 B2, U.S. Pat. No. 9,352,229 B2, U.S. Pat. No. 9,492,744 B2, U.S. D667,892 S, U.S. D721,139 S, U.S. D728,030 S, U.S. D730,451 S, U.S. D733,802 S, U.S. D748,734 S, and published U.S. patent applications U.S. 20160082349 A1, U.S. 20160296837 A1, and U.S. 20160346682 A1, all of these patents and patent applications hereby being incorporated by reference herein. The Microsoft Corporation licensed some of the patents of Scuf Gaming International LLC and/or Ironburg Inventions Ltd. to commercialize the Microsoft Xbox One Elite® game controller.

SUMMARY

A first aspect of the present invention provides a hand held game controller comprising: a case comprising a top side, a bottom side, a front side, a rear side, a left side, a left shoulder portion, a left handle portion, a right side, a right shoulder portion, a right handle portion, and a middle portion; comprising at least two controls on each of said left handle portion and said right handle portion on said bottom side.

Optionally, the middle portion comprises at least two controls on said bottom side.

Optionally, the at least two controls on said bottom side comprise paddle controls.

Optionally, the at least two controls on said bottom side comprise push-button key controls.

Optionally, the at least two controls on said bottom side comprise at least one touch pad control.

Optionally, the at least one touch pad control distinguishes the touch of multiple independent fingers.

Optionally, the left handle portion and the right handle portion each comprise at least one customizable and removable grip portion.

Optionally, the game controller comprises at least one control comprising a normally closed switch which connects a first closed electrical circuit to ground in the resting position, but which removes the connection to ground and permits electrical energy to flow in a second closed electric circuit when the control is actuated by a user.

Optionally, the game controller comprises at least two thumbstick controls.

Optionally, the game controller comprises two thumbstick controls located on said top side of said case and arranged in a symmetrical configuration relative to said left handle portion, said middle portion, and said right handle portion.

Optionally, the game controller comprises two thumbstick controls located on said top side of said case and arranged in an asymmetrical configuration relative to said left handle portion, said middle portion, and said right handle portion.

Optionally, the thumbsticks further comprise a push button control.

Optionally, the case comprises a receptacle for receiving and a retaining ring for securing at least one removably attachable gate comprising a geometric shape for customizing the play of at least one control.

Optionally, the gate comprises a geometric shape selected from the group of geometric shapes consisting of: a circular shape, an octagonal shape, a square shape, and a diamond shape.

Optionally, the game controller further comprises a plurality of other additional individual controls selected from the group consisting of: an on/off control, a keyboard control, a master control, a menu control, a control remapping control, a camera control, a chat control, at least one shift control, at least one bumper control, at least one trigger control, at least one hair trigger lock control, at least one sensitivity control, at least one cross-shaped directional control, at least one paddle control, at least one push button control, at least one touch screen control, at least one touch pad control, at least one joystick control, at least one thumbstick control, and, at least one action button control.

Optionally, the game controller comprising means for communication with at least one of a game console and a game platform, said means for communication selected from the group consisting of: a wire connection, and a wireless connection.

A second aspect of the present invention provides a hand held game controller comprising:
a case comprising a top side, a bottom side, a front side, a rear side, a left side, a left shoulder portion, a left handle portion, a right side, a right shoulder portion, a right handle portion, and a middle portion; said left handle portion comprising a first customizable and removable grip portion on said left side, and said right handle portion comprising a second customizable and removable grip portion on said right side for accommodating different users having small, medial, and large hands.

A third aspect of the present invention provides a hand held game controller comprising: a case comprising a top side, a bottom side, a front side, a rear side, a left side, a left shoulder portion, a left handle portion, a right side, a right shoulder portion, a right handle portion, and a middle portion; comprising a removable gate comprising a geometric shape for customizing the play of at least one control.

Optionally, the gate comprises a geometric shape selected from the group consisting of: a circular shape, an octagonal shape, a square shape, and a diamond shape.

A fourth aspect of the present invention provides a hand held game controller comprising: a case comprising a top side, a bottom side, a front side, a rear side, a left side, a left shoulder portion, a left handle portion, a right side, a right shoulder portion, a right handle portion, and a middle portion; and at least one control comprising a normally closed switch which connects a first closed electrical circuit to ground in the resting position, but which breaks the connection to the circuit to ground and permits electrical energy to flow in the second closed electric circuit when said control is actuated by a user.

A fifth aspect of the present invention provides a hand held game controller comprising a plurality of controls, wherein a majority of said plurality of controls are touch controls.

Optionally, the game controller comprises a case comprising a top side, a bottom side, a front side, a rear side, a left side, a left shoulder portion, a left handle portion, a right side, a right shoulder portion, a right handle portion, and a middle portion.

Optionally, the game controller comprises a plurality of other additional controls selected from the group consisting of: an on/off control, a keyboard control, a master control, a menu control, a control remapping control, a camera control, a chat control, at least one shift control, at least one bumper control, at least one trigger control, at least one hair trigger lock control, at least one sensitivity control, at least one cross-shaped directional control, at least one paddle control, at least one push button control, at least one touch screen control, at least one touch pad control, at least one joystick control, at least one thumbstick control, and, at least one action button control.

BRIEF DESCRIPTION OF THE DRAWINGS

Aspects of the invention are described in detail below with reference to the attached drawing figures, wherein.

DETAILED DESCRIPTION

Figure 1:
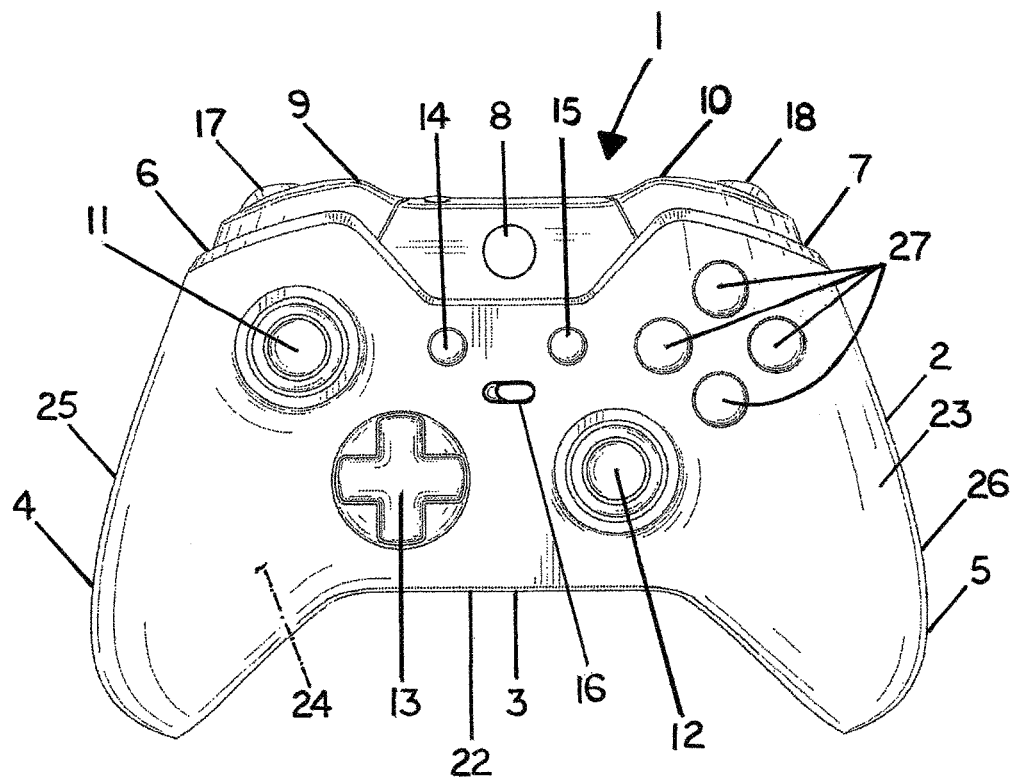
FIG. 1 is a top view of a game controller according to one embodiment having asymmetrical placement of thumbstick controls.

Detailed descriptions of specific embodiments of the game controller and its actuator mechanisms and other features are disclosed herein. It can be readily understood that the disclosed embodiments are merely examples of the way in which certain aspects of the invention can be implemented and do not represent all of the ways the invention may be embodied. The game controller and its actuator mechanisms and other features described herein may be embodied in various alternative forms. Further, the drawing figures are not necessarily to scale and some features may be enlarged or minimalized to show certain details and features of particular embodiments. Some well-known structures, components, features, materials, and methods are not necessarily described in great detail for the sake of brevity and in order to focus upon the present invention. Any specific structural and functional details disclosed herein are not to be interpreted as limiting, but rather are provided for teaching one skilled in the art to variously employ the invention, and as basis for the claims.

FIG. 1 is a top view of a game controller 1 according to one embodiment including a left thumbstick control 11 and a right thumbstick control 12 located asymmetrically relative to the left handle portion 4, the middle portion 3, and the right handle portion 5 of the game controller 1 similar to the Microsoft Xbox One® game controller which is believed to be represented in U.S. D709,882 S by Morris et al. The embodiment of a game controller 1 shown in FIG. 1 includes a case 2 having a front side 21, back side 22, top side 23, bottom side 24, left side 25, right side 26, left shoulder portion 6, a right shoulder portion 7, a middle portion 3, a left handle portion 4, and a right handle portion 5. As shown, the top view of the controller 1 shows an on and off control 8, a left selection control 14 which can be used as a back control switch and for other functions, a right selection control 15 which can be used as a menu control switch and for other functions, a mapping preset control 16 for changing between a plurality of mapping presets, a left trigger control 9 and a left bumper control 17 on the left shoulder portion 6, a right trigger control 10 and a right bumper control on the right shoulder portion 7, four action controls 27 which can be labeled A, B, X, and Y, and a cross-shaped directional pad control 13. Other mechanical controllers and switches for possible use in a game controller can be push button, slide, rocking, rotating, throwing, pulling, key-turning, magnetic, and toggle actuated.

Figure 2:
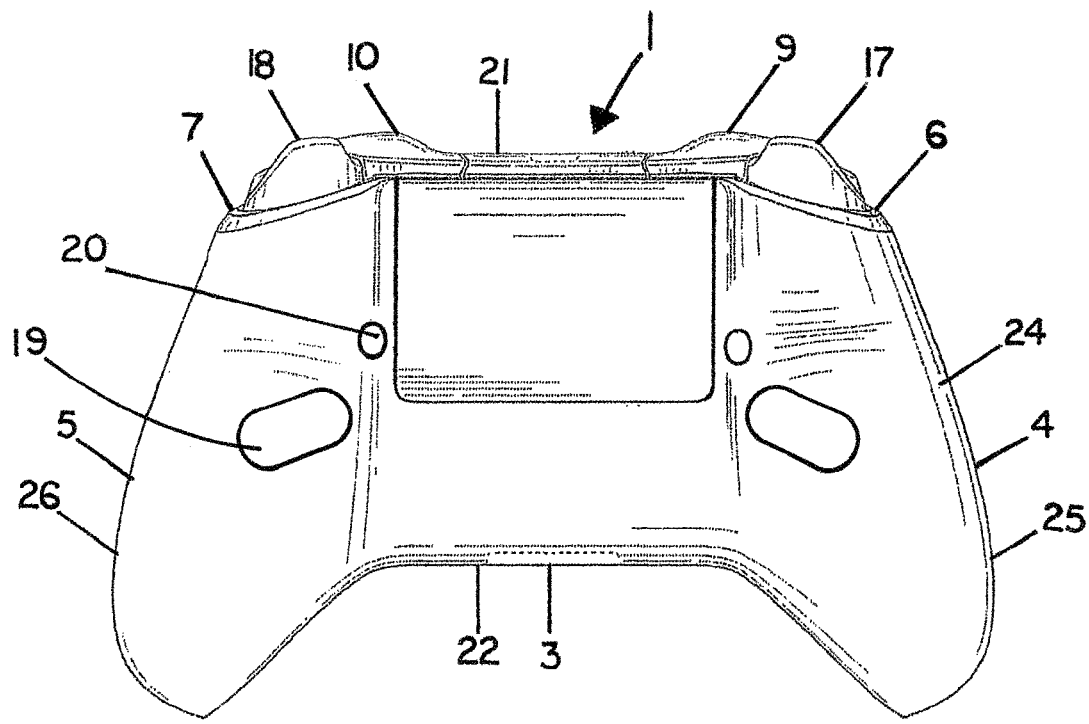
FIG. 2 is a bottom view of the game controller shown in FIG. 1 showing paddle controls on the left and right handle portions of the game controller.

FIG. 2 is a bottom view of the game controller 1 shown in FIG. 1. Unlike, the Microsoft Xbox One® and Microsoft Xbox One Elite® game controllers which are believed to be represented in U.S. D709,882 S by Morris et al. and U.S. D772,988 S by Kujawski et al., the embodiment which is shown in FIG. 1 includes paddle controls 19 which are secured on the left handle portion 4, and also the right handle portion 5 of the game controller 1. The game controller 1 shown in FIG. 2 also includes a left bumper control 17 and left trigger control 9 on the left shoulder portion 6, a right bumper control 18 and a right trigger control 10 on the right shoulder portion 7, and two hair trigger lock controls 20.

Figure 3:
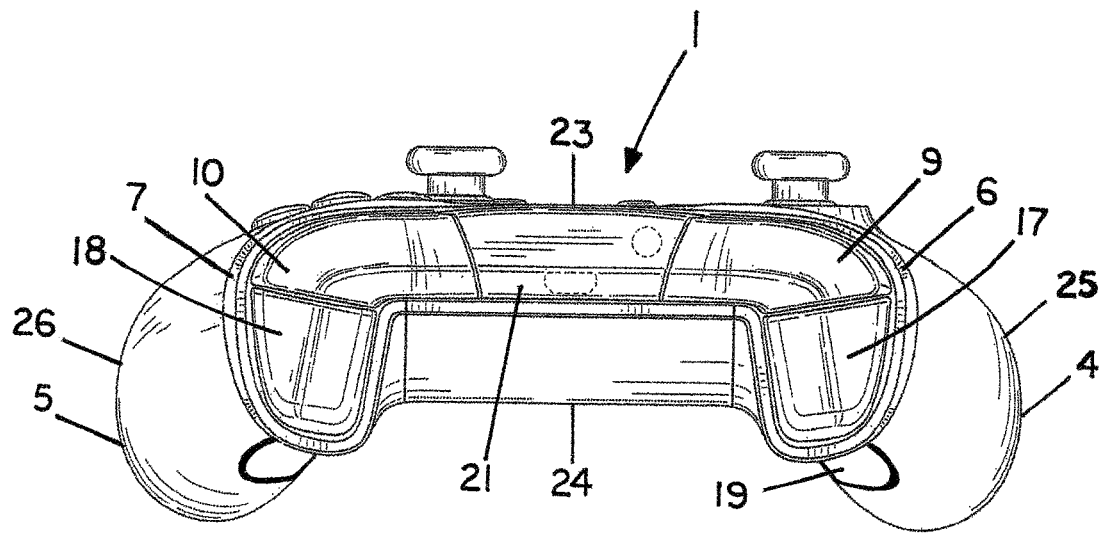
FIG. 3 is a front view of the game controller shown in FIG. 1.

FIG. 3 is a front view of the game controller 1 shown in FIG. 1 showing a left trigger control 9 and a left bumper control 17 on the left shoulder portion 6, and a right trigger control 10 and a right bumper control 18 on the right shoulder portion 7 of the game controller 1, and a portion of the two paddle controls 19 can also be seen.

Figure 4:
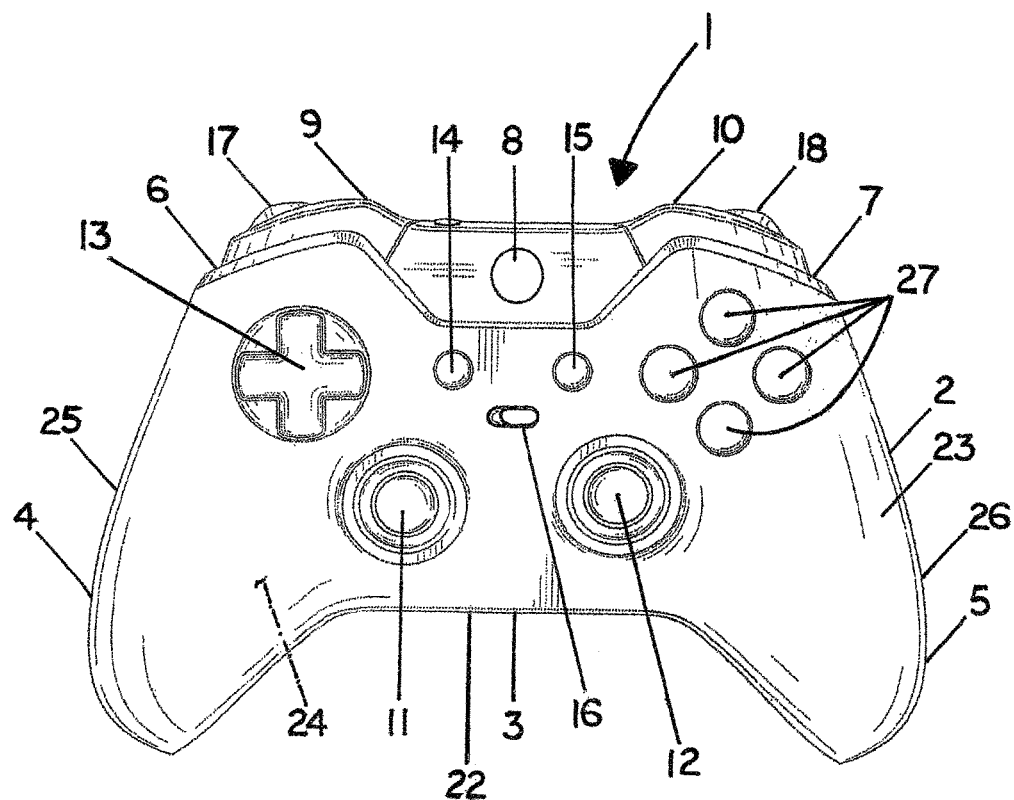
FIG. 4 is a top view of a game controller according to one embodiment generally similar to that shown in FIG. 1, but having a symmetrical placement of thumbstick controls on the top side.

FIG. 4 is a top view of a game controller 1 according to one embodiment which is generally similar to that shown in FIG. 1, but having a symmetrical placement of the left thumbstick control 11 and right thumbstick control 12 on the top side 23.

Figure 5:
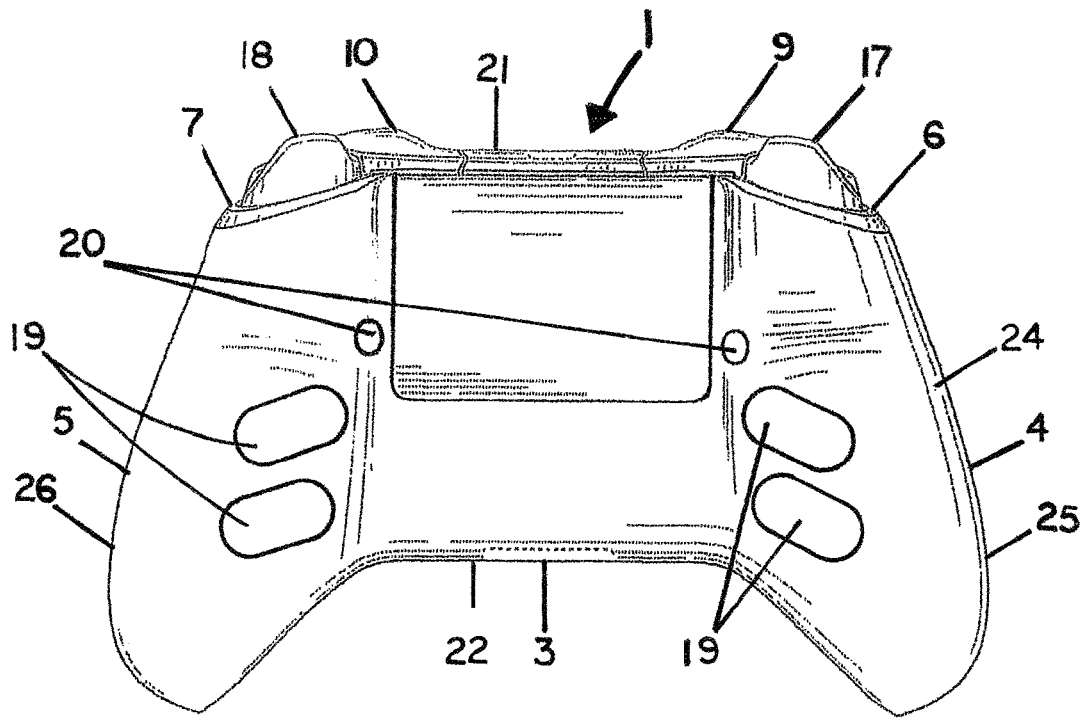
FIG. 5 is a bottom view of a game controller according to one embodiment similar to that shown in FIG. 2, but including two paddle controls on each of the left and right handle portions of the game controller.

FIG. 5 is a bottom view of a game controller 1 according to one embodiment that is generally similar to that shown in FIG. 2, but which includes two paddle controls 19 on the left handle portion 4 and two paddle controls 19 on the right handle portion 5 of the game controller 1. It can be readily understood that users normally have five fingers on their hands including the thumb. Counting the thumb as the first finger, the index finger is the second finger, the middle finger is the third finger, and the fourth finger, and then the fifth finger which is normally the smallest. In this regard, the paddle controls 19 can be actuated by a user's third or middle finger and also a user's fourth and fifth fingers.

Figure 6:
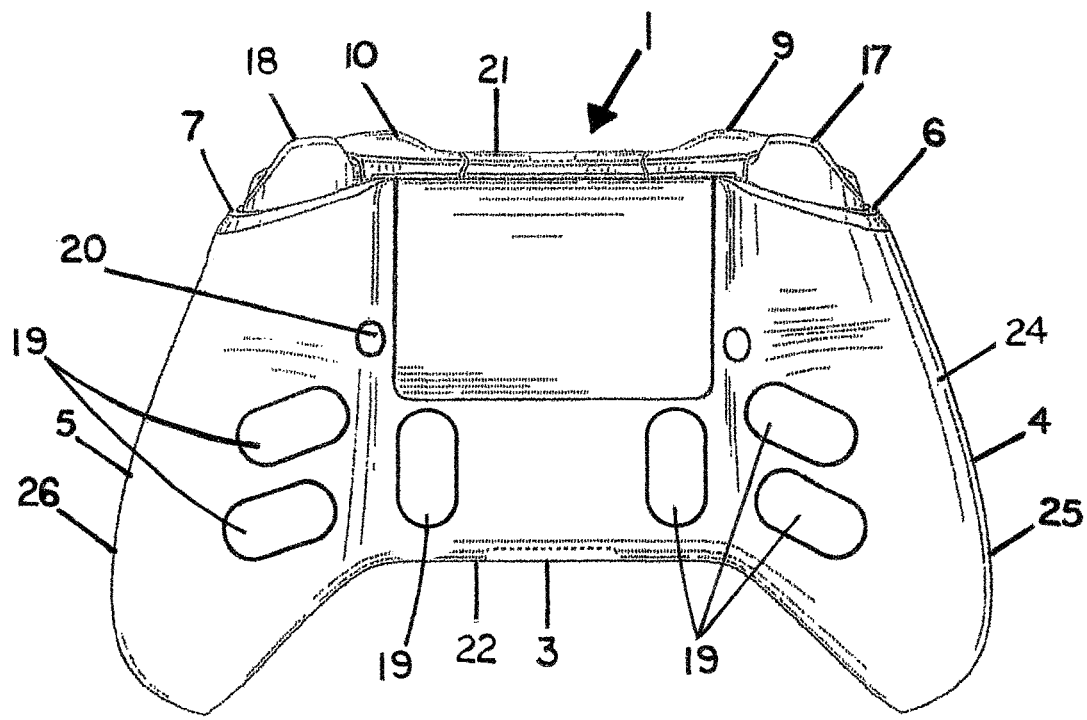
FIG. 6 is a bottom view of a game controller according to one embodiment similar to that shown in FIG. 5, but further including two paddle controls on the middle portion of the game controller.

FIG. 6 is a bottom view of a game controller 1 according to one embodiment that is generally similar to that shown in FIG. 5, but which further includes two controls on the middle portion 3 of the game controller 1. The two controls can be a toggle or paddle controls, and other mechanical controllers and switches for possible use in a game controller can be push button, slide, rocking, rotating, throwing, pulling, key-turning, and magnetic actuated.

Figure 7:
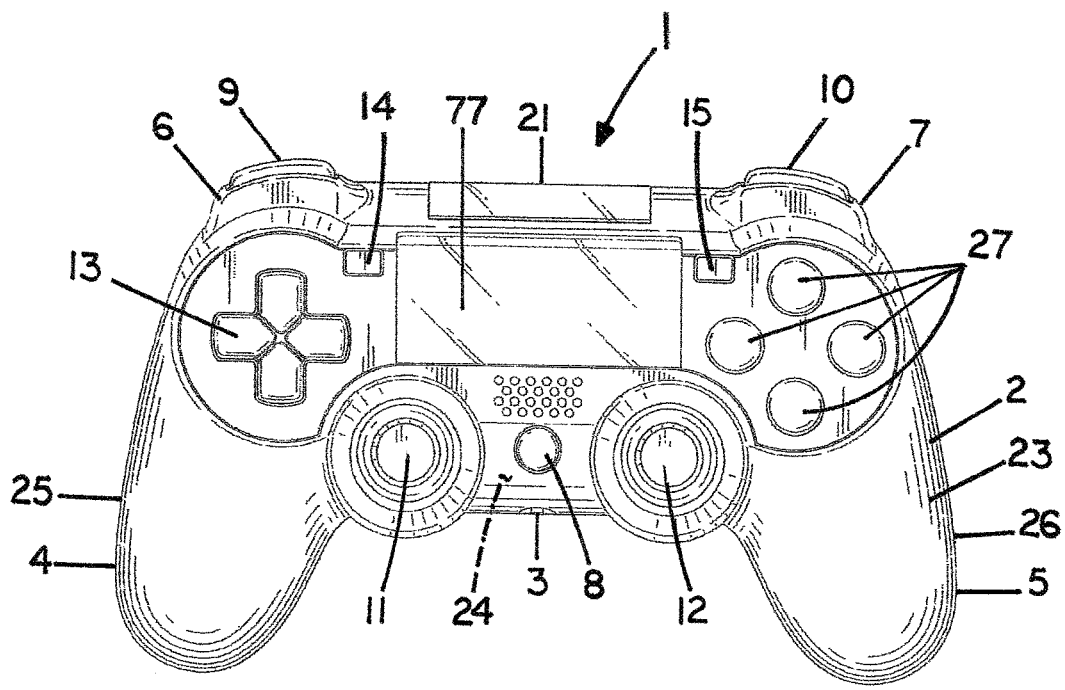
FIG. 7 is a top view of a game controller according to one embodiment having symmetrical placement of thumbstick controls on the top side.

FIG. 7 is a top view of a game controller 1 according to one embodiment which has a left thumbstick control 11 and a right thumbstick control 12 located symmetrically relative to the left handle portion 4, the middle portion 3, and the right handle portion 5 of the game controller 1 on the top side 23 similar to the Sony® PS4 game controller which is believed to be represented in U.S. D715,296 S by Huang. The game controller 1 shown in FIG. 7 includes a case 2 having a front side 21, back side 22, top side 23, bottom side 24, left side 25, right side 26, a left shoulder portion 6, a right shoulder portion 7, a middle portion 3, a left handle portion 4, and a right handle portion 5. As shown, the top view of the controller 1 shows an on and off control 8, a left selection control 14 which can be used as a back control and for other functions, a right selection control 15 which can be used as a menu control and for other functions, a control 16 for changing between mapping presets, a left trigger control 9 on the left shoulder portion 6, a right trigger control 10 on the right shoulder portion 7, four action controls 27 which can be labeled A, B, X, and Y, a cross-shaped directional pad control 13, and a touch control screen 77.

Figure 8:
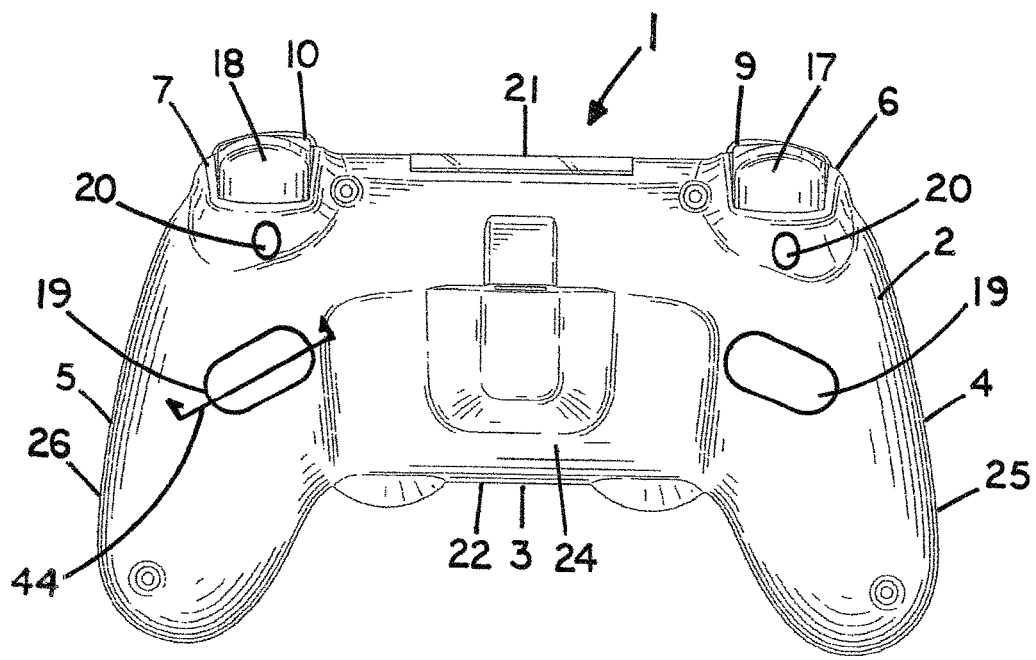
FIG. 8 is a bottom view of the game controller shown in FIG. 7 showing paddle controls on the left and right handle portions of the game controller.

FIG. 8 is a bottom plan view of the game controller 1 shown in FIG. 7, but which includes a paddle control 19 on the left handle portion 4 and a paddle control 19 on the right handle portion 5 of the game controller 1. Unlike, the Microsoft Xbox One® and Microsoft Xbox One Elite® game controllers which are believed to be represented in U.S. D709,882 S by Morris et al. and U.S. D772,988 S by Kujawski et al., the embodiment which is shown in FIG. 7 includes paddle controls 19 which are secured on the left handle portion 4, and also the right handle portion 5 of the game controller 1. The game controller 1 shown in FIG. 8 also includes a left bumper control 17 and left trigger control 9 on the left shoulder portion 6, a right bumper control 18 and a right trigger control 10 on the right shoulder portion 7, and two hair trigger lock controls 20.

Figure 9:
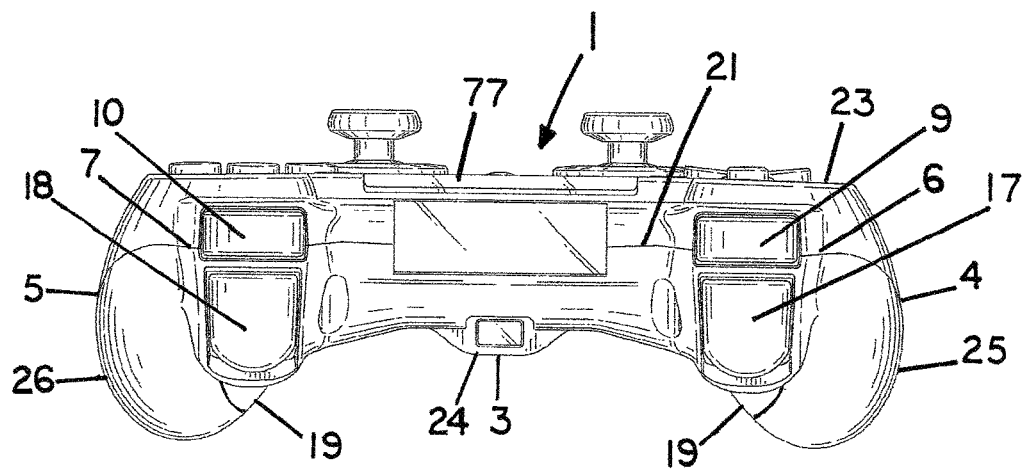
FIG. 9 is a front view of the game controller shown in FIG. 7.

FIG. 9 is a front view of the game controller shown in FIG. 7 showing a left trigger control 9 and a left bumper control 17 on the left shoulder portion 6, and a right trigger control 10 and a right bumper control 18 on the right shoulder portion 7 of the game controller 1, and a portion of the paddle controls 19, and a touch screen control 77 can also be seen.

Figure 10:
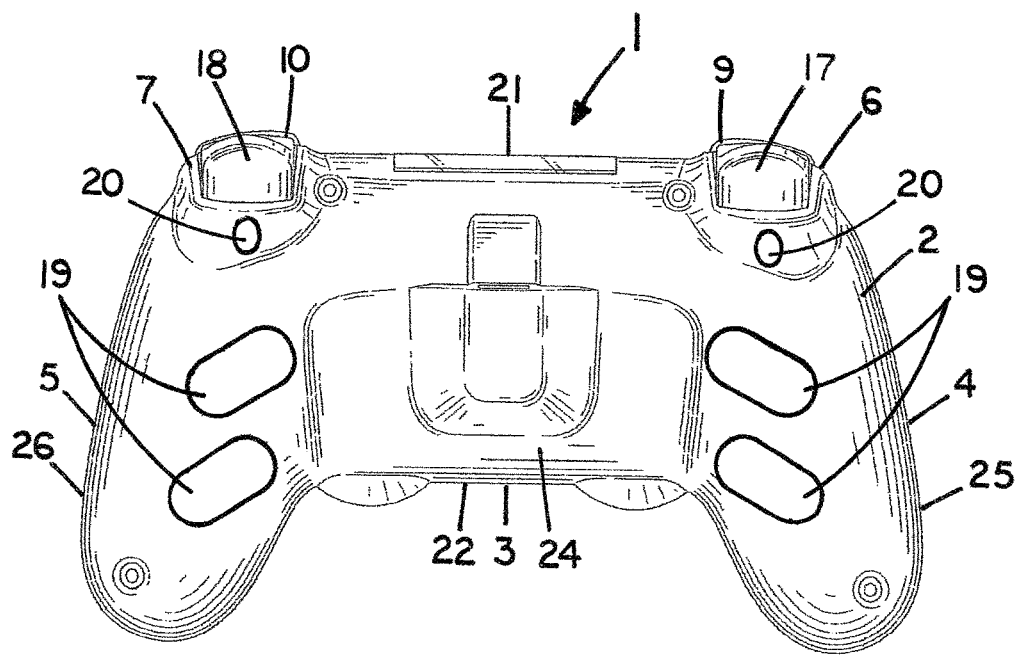
FIG. 10 is a bottom view of a game controller according to one embodiment similar to that shown in FIG. 8, but including two paddle controls on each of the left and right handle portions of the game controller.

FIG. 10 is a bottom plan view of a game controller 1 according to one embodiment that is generally similar to that shown in FIG. 8, but which includes two paddle controls 19 on the left handle portion 4 and two paddle controls 19 on the right handle portion 5 of the game controller 1.

Figure 11:
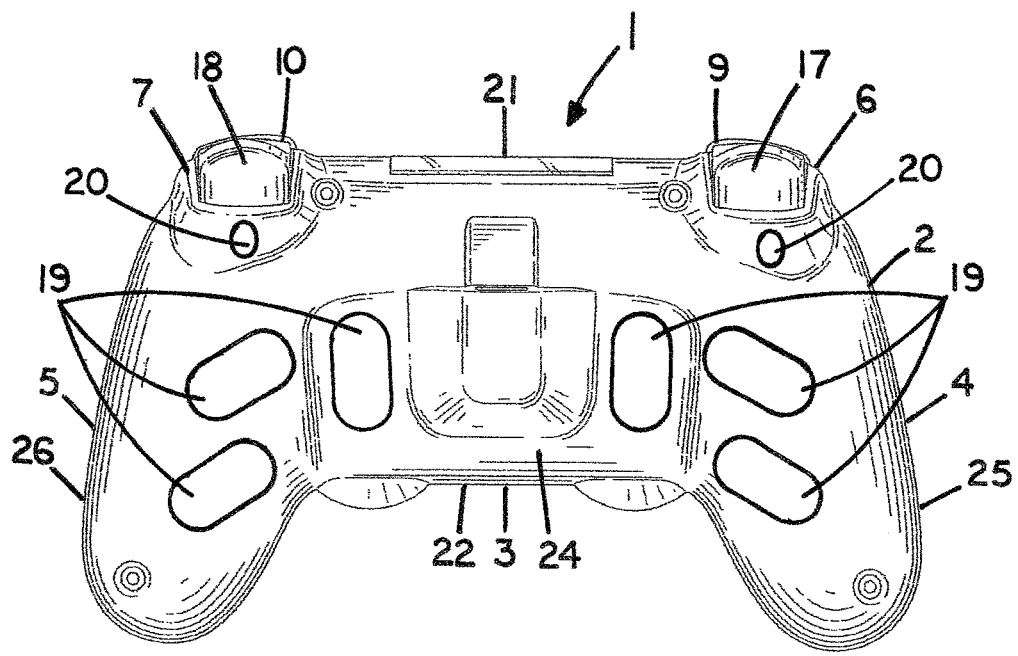
FIG. 11 is a bottom view of a game controller according to one embodiment similar to that shown in FIG. 10, but further including two paddle controls in the middle portion of the game controller.

FIG. 11 is a bottom plan view of a game controller 1 according to one embodiment that is generally similar to that shown in FIG. 8, but which further includes two paddle controls 19 in the middle portion of the game controller 1.

Figure 12:
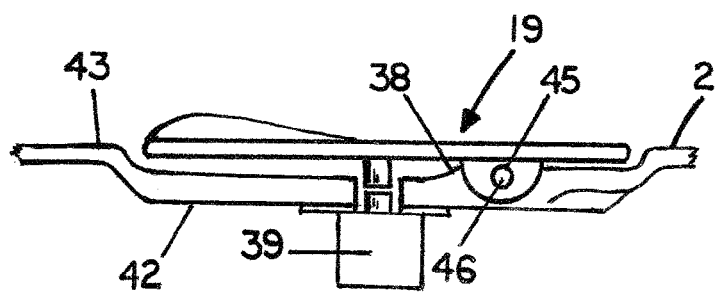
FIG. 12 is a cross-section view of a paddle control and push-button control switch according to one embodiment on the left handle portion of a game controller which is generally similar to that shown in FIG. 8, taken along line 44. The paddle control design and position of the push button control switch below is such that depressing the paddle control causes the control switch to be actuated.

FIG. 12 is a cross-section view of the left handle portion 4 of the game controller 1 shown in FIG. 8 taken along line 44, showing a portion of the interior side 42 of the case 2 and a push button control switch 39 which can be actuated by paddle control 19. The control mount 38 and switch 39 for use can be generally similar to those disclosed in the drawing FIGS. 5, 6, 15, 16, and the specification of published U.S. Patent Application 20160346682 A1 by Burgess et al., and/or as shown and discussed herein. For example, U.S. 20160346682 A1 by Burgess et al. shows in drawing FIG. 5 a portion of a game controller including four single pole push button momentary control switches that are normally associated with open circuits in the rest position and which can be made to make contact and close their corresponding circuits enabling electrical energy to flow to the game console logic board or other destination where user activation of the switch is sensed when actuated with a paddle control by a user. In this regard, when actuated a paddle control depresses the bush button on the control switch below to close the corresponding circuit. A similar structure and push bottom control switch 39 can be used in a game controller 1 according to the embodiment which is shown in FIG. 8, herein. Alternatively, the paddle control switch 39 could include a normally closed switch 39 associated with a closed circuit which goes to ground in the rest position. In this regard, the control switch 39 can be single pole push button momentary control switch that is normally associated with a first closed circuit 81 which goes to ground when in the closed and resting position, but which can be made to open and therefore break the first closed circuit 81 which goes to ground and thereby cause electrical energy to instead flow in a second closed circuit 82 to the game console logic board or other destination where user activation of the switch is sensed when the control switch 39 is actuated with the paddle control 19 by a user. One possible advantage of the latter type of normally closed switch and wiring configuration is that it could possibly require less movement and deflection for effective operation and/or less wear on the contact surfaces resulting in greater durability.

Figure 13:
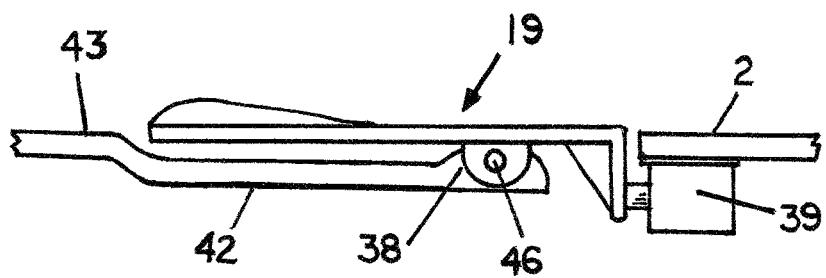
FIG. 13 is a cross-sectional view of a portion of the case of an alternative embodiment of a game controller and a push button control switch which can be activated with a paddle control by a user which is generally similar to that shown in FIG. 8, taken along line 44. The paddle control design and sideways position of the push button control switch is such that depressing the paddle control causes the control switch to be actuated.

FIG. 13 is a cross-sectional view showing a portion of the interior side 42 of the case 2 of a game controller 1 and a push button control switch 39 according to one embodiment which can be activated with a paddle control 19 by a user which is generally similar to that shown in FIG. 8, taken along line 44. The paddle control 19 design and sideways position of the push button control switch 39 is such that depressing the paddle control 19 causes the control switch 39 to be actuated. The push button control switch 39 can be a single pole push button momentary control switch 39 that is normally associated with an open circuit in the rest position and which can be made to make contact and close its corresponding circuit enabling electrical energy to flow to the game console logic board or other destination where user activation of the switch is sensed when the paddle control 19 is actuated by a user. Alternatively, the control switch 39 can be single pole push button momentary control switch that is normally associated with a first closed circuit 81 which goes to ground in the normally closed and resting position, but which can be made to break and open the first closed circuit 81 which goes to ground and thereby cause electrical energy to instead flow in a second closed circuit 82 to the game console logic board or other destination where user activation of the control switch 39 is sensed when the control switch 39 is actuated with a paddle control 19 by a user.

Figure 14:
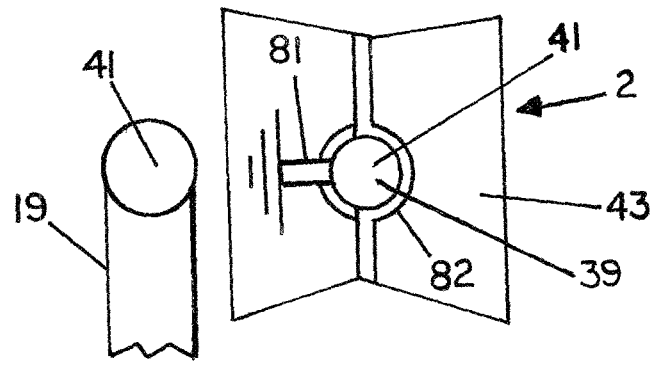
FIG. 14 is a schematic view which relates to a portion of the case of an alternative game controller and a control switch with parts broken away which can be activated with a paddle control by a user. The paddle control includes an electrically conductive contact which in the normally resting and closed position connects to a first closed ground circuit and also a second closed circuit, but when the paddle control is actuated the first closed circuit to ground is broken and electrical power can flow in the second closed circuit.

FIG. 14 is a schematic view which relates to a portion of the case 2 of an alternative embodiment of a game controller 1 and a control switch 39 according to one embodiment which can be activated with a paddle control 19 including a contact 41. The control switch 39 is normally associated with a first closed circuit 81 which goes to ground in the closed and resting position, but which can be made to break and open the first closed circuit 81 which goes to ground and thereby cause electrical energy to instead flow in a second closed circuit 82 which is no longer grounded, and then to the game console logic board or other destination where user activation of the control switch 39 is sensed when the control switch 39 is actuated with a paddle control 19 by a user. As shown in FIG. 14, the second closed circuit 82 which goes to the game console logic board or other destination where user activation of the control switch 39 is sensed is on one side or portion of a contact 41 and the first closed circuit 81 which goes to ground is located in close proximity on another side or portion of the contact 41, but is not in direct electronic communication with the second closed circuit 82. The paddle control 19 includes a corresponding contact 41 which is electrically conductive so that when the control switch 39 is in the normal closed and resting position there is electronic communication between the first closed circuit 81 and the second closed circuit 82 which effectively grounds the second closed circuit 82. However, when the paddle control 19 is actuated, the electronic communication between the first closed circuit 81 which goes to ground and the second closed circuit 82 is broken, and there is then electronic communication to the game console logic board or other destination where user activation of the control switch 39 is sensed when the control switch 39 is actuated by the paddle control 19.

Figure 15:
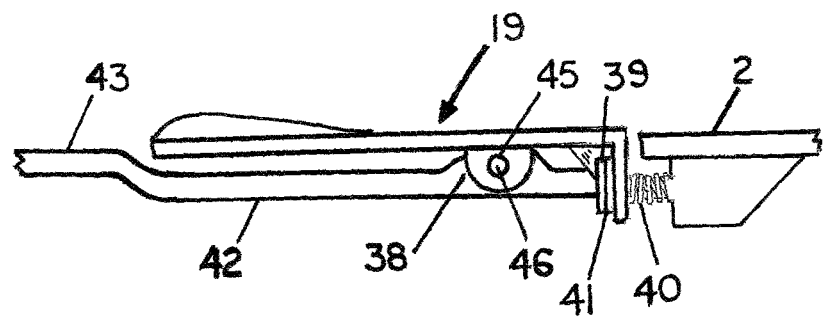
FIG. 15 is a cross-sectional view of a portion of the case of an alternative game controller and a control switch which can be activated with a paddle control by a user which is generally similar to that shown in FIG. 8, taken along line 44. The paddle control design and sideways position of the control switch spring and contact is such that depressing the paddle control causes the control switch to be actuated.

FIG. 15 is a cross-sectional view of a portion of the case 2 of a game controller 1 and a control switch 39 according to one embodiment which is generally similar to that shown in FIG. 8, taken along line 44, and which can be activated with a paddle control 19 by a user. The paddle control 19 design and sideways position of the control switch 39 spring 40 and contact 41 is such that depressing the paddle control 19 causes the control switch 39 to be actuated. As shown, the control switch 39 is normally associated with a first closed circuit 81 which goes to ground in the closed and resting position, but can be made to break and open the first closed circuit 81 which goes to ground and thereby cause electrical energy to instead flow in a second closed circuit 82 to the game console logic board or other destination where user activation of the control switch 39 is sensed when the control switch 39 is actuated with a paddle control 19 by a user.

Figure 16:
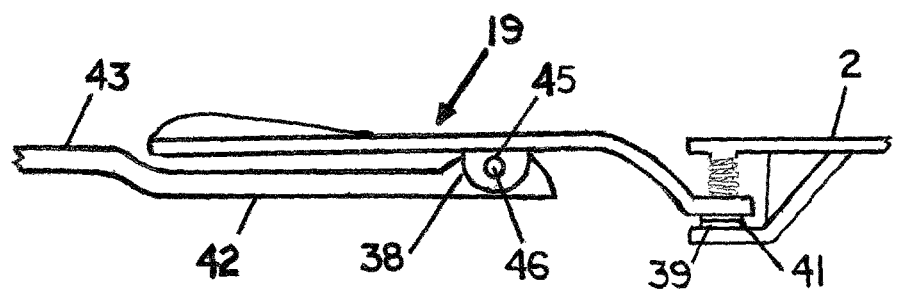
FIG. 16 is a cross-sectional view of a portion of the case of an alternative game controller and a control switch which can be activated with a paddle control by a user which is generally similar to that shown in FIG. 8, taken along line 44. The paddle control design and approximately vertical position of the control switch spring and contact is such that depressing the paddle control causes the control switch to be actuated.

FIG. 16 is a cross-sectional view of a portion of the case 2 of a game controller 1 and a control switch 39 according to one embodiment which is generally similar to that shown in FIG. 8, taken along line 44, and which can be activated with a paddle control 19 by a user. The paddle control 19 design and approximately vertical position of the control switch 39 spring 40 and contact 41 is such that depressing the paddle control 19 causes the control switch 39 to be actuated. As shown, the control switch 39 is normally associated with a first closed circuit 81 which goes to ground in the closed and resting position, but can be made to break and open the first closed circuit 81 which goes to ground and thereby cause electrical energy to instead flow in a second closed circuit 82 to the game console logic board or other destination where user activation of the control switch 39 is sensed when the control switch 39 is actuated with a paddle control 19 by a user.

Figure 17:
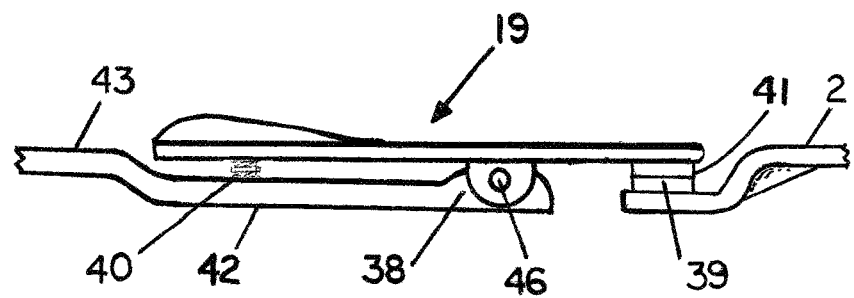
FIG. 17 is a cross-sectional view of a portion of the case of an alternative game controller and a control switch which can be activated with a paddle control by a user which is generally similar to that shown in FIG. 8, taken along line 44. The paddle control design and external position of the control switch spring and contact is such that depressing the paddle control causes the control switch to be actuated.
Figure 18:
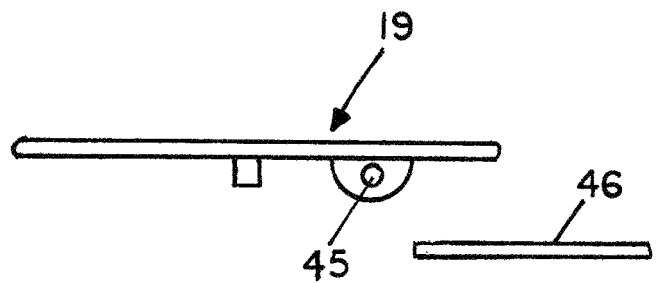
FIG. 18 is a side view of one end of an alternative paddle control showing an opening for receiving a removable retaining pin.
Figure 19:
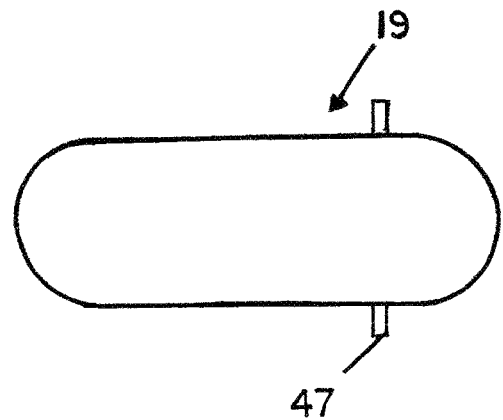
FIG. 19 is a bottom view of one end of an alternative paddle control showing an integral axle for mating with a female receptacle.
Figure 20:
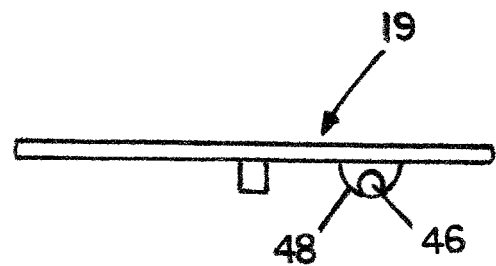
FIG. 20 is a side view of one end of an alternative paddle control showing a semi-circular female receptacle for mating with a pin fixed in the case or a removable retaining pin as shown in FIG. 18.
Figure 21:
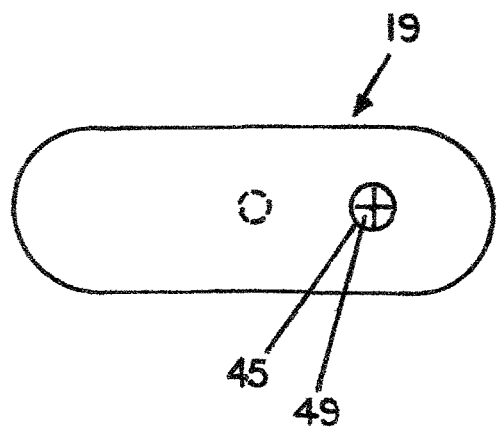
FIG. 21 is a top view of one end of an alternative paddle control including an opening for receiving a screw.
Figure 22:
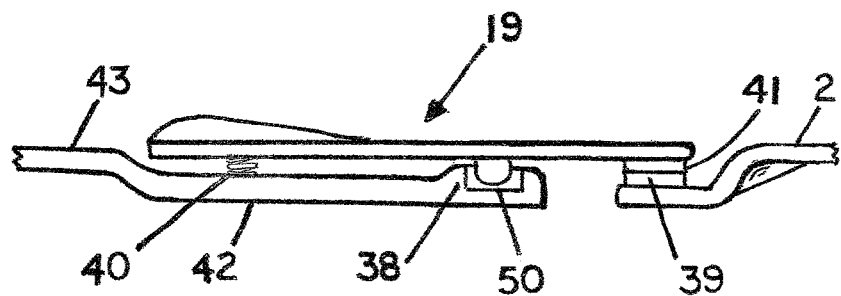
FIG. 22 is a cross sectional view of a portion of the case of an alternative embodiment of a game controller showing an alternative paddle control including a magnet 50 for mating with a second magnet secured to the case of the game controller which is generally similar to that shown in FIG. 8, taken along line 44.

FIG. 17 is a cross-sectional view of a portion of the case 2 of a game controller 1 and a control switch 39 according to one embodiment which is generally similar to that shown in FIG. 8, taken along line 44, and which can be activated with a paddle control 19 by a user. The paddle control 19 design and external position of the control switch 39 spring 40 and contact 41 is such that depressing the paddle control 19 causes the control switch 39 to be actuated. As shown, the control switch 39 is normally associated with a first closed circuit 81 which goes to ground in the closed and resting position, but can be made to break and open the first close circuit 81 which goes to ground and thereby cause electrical energy to instead flow in a second closed circuit 82 to the game console logic board or other destination where user activation of the control switch 39 is sensed when the control switch 39 is actuated with a paddle control 19 by a user. In this alternative embodiment of a game controller 1, the paddle control 19, control mount 38, retaining pin 46, spring 40, and contact 41 are all on the exterior side 43 of the case 2 which can facilitate customization and also removal and replacement of component parts. In this regard, different configurations of alternative paddle controls 19, but also different alternative springs 40 having different stiffness, and also different alternative contacts 41 can be used as desired by a user to customize a game controller 1 for game play. The contact 41 can include a conductive metal, but also a plastic, thermoplastic or rubber material which can serve as a pad. In this regard, the inclusion of carbon black can render a thermoplastic or rubber material electrically conductive. Further, different paddle control 19 and switch 39 embodiments can be removably attached to game controllers 1 according to alternative embodiments using different structures and means, e.g., a paddle control 19 can alternatively include: an opening 45 for receiving a removable retaining pin 46 as shown in FIG. 18; an integral axle 47 for snap-fitting into a mating female receptacle as shown in FIG. 19; a semi-circular receptacle 48 for mating with a pin fixed in the case 2 or a removable retaining pin 46 as shown in FIG. 20; an opening 45 for receiving a screw 49 as shown in FIG. 21; and, a magnet 50 as shown in FIG. 22, and the like.

Figure 23:
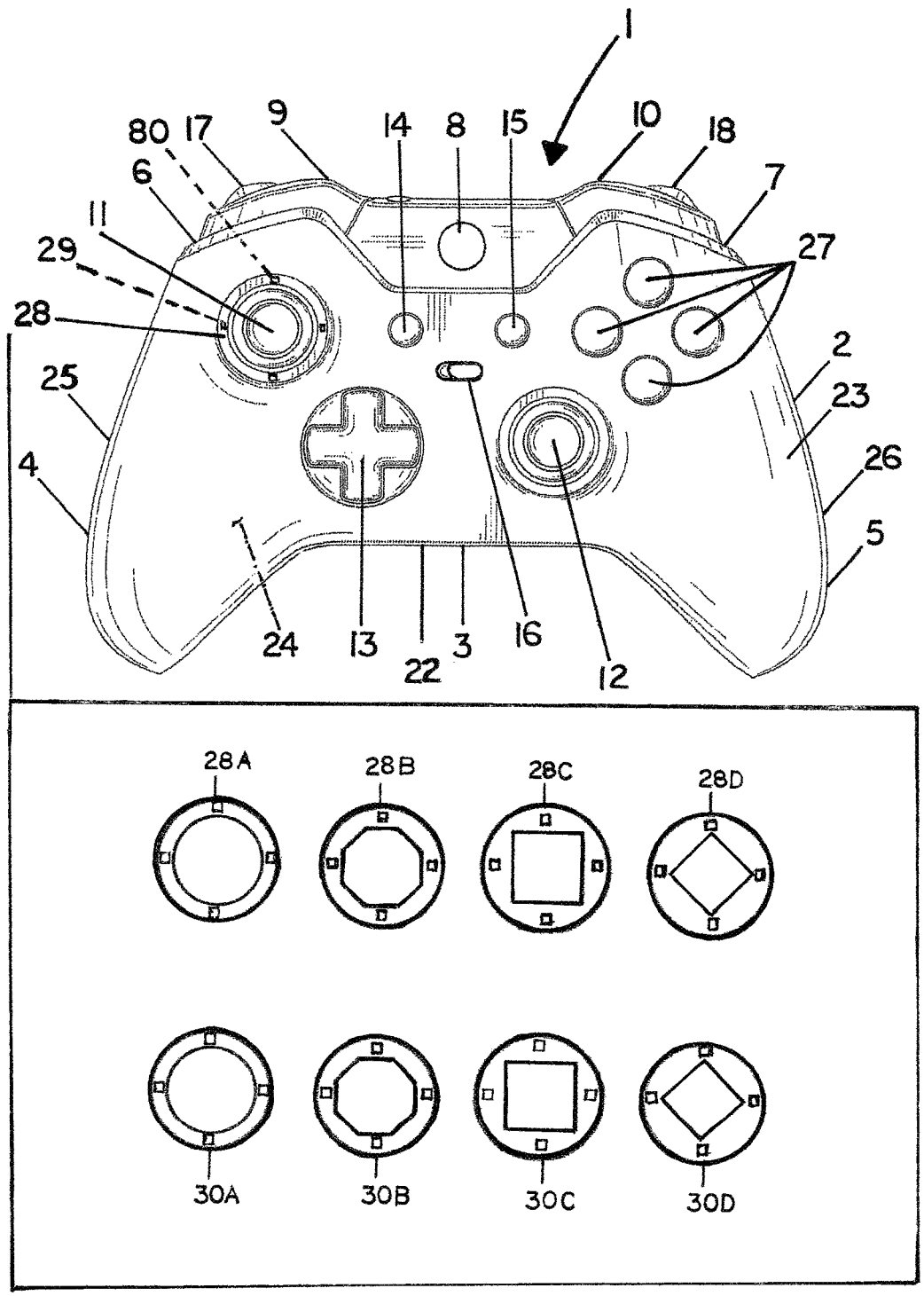
FIG. 23 is a top view of a game controller similar to that shown in FIG. 1, showing alternative retaining rings and/or gates having different geometric shapes which can be used to customize the play of thumbstick controls.

FIG. 23 is a top plan view of a game controller 1 generally similar to that shown in FIG. 1, showing a case 2 including at least one receptacle 29 for receiving different alternative removable retaining rings 28 having different geometric shapes for possible use in securing and customizing the play of a joystick control such as thumbstick control 11 and/or thumbstick control 12. The different alternative retaining rings 28 can include an integral gate 30 and/or secure a gate 30 comprising a particular geometric shape for customizing the play of at least one joystick control such as thumbstick control 11 and/or thumbstick control 12. As shown in the box portion of FIG. 23 different optional retaining rings 28 including an integral gate 30 such as a circular retaining ring 28A, octagonal retaining ring 28B, square retaining ring 28C, or a diamond retaining ring 28D can include four male snap fit appendages 79 for inserting into mating female snap fit openings 80. Alternatively, individual removable circular gate 30A, octagonal gate 30B, square gate 30C, or diamond gate 30D can include registered notches and/or openings 45 for permitted the snap fit appendages 79 on a circular retaining ring 28A to pass therethrough and then be removably secured to the receptacle 29 portion of the case 2 are also shown. A selectively removable retaining ring 28 and/or gate 30 can have a geometric shape selected from the group consisting of: a circular shape, an octagonal shape, a square shape, a diamond shape, and other geometric shapes. The retaining rings 28 and/or gates 30 can be associated with 8 way, 4 way, 2 way, and other functions and operations associated with game play.

Figure 24:
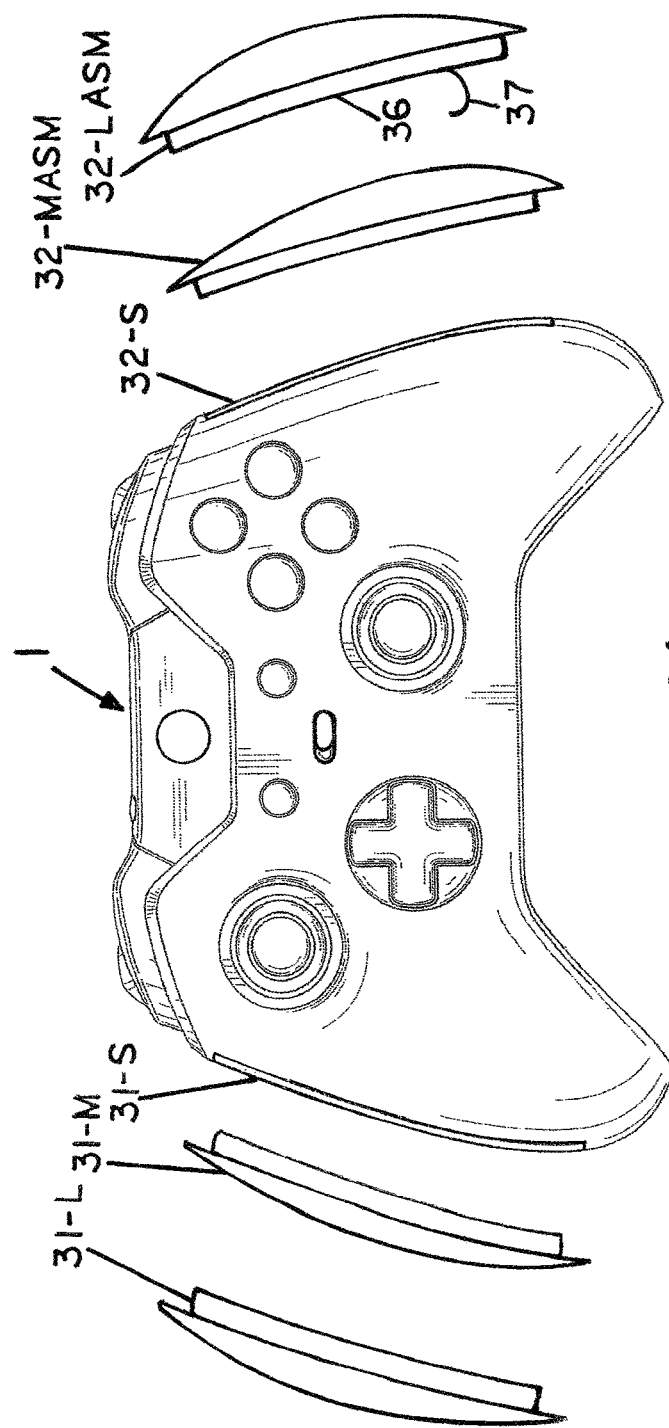
FIG. 24 is a top view of a game controller similar to that shown in FIG. 1 showing different customizable and selectively removable ergonomic grips for accommodating users having small, medium, and large hand sizes.

FIG. 24 is a top view of a game controller 1 similar to that shown in FIG. 1 showing different customizable and selectively removable ergonomic left grip 31 and right grip 32 for accommodating users having small, medium, and large hand sizes. In particular, the left grip 31 and right grip 32 can be removably attached using a friction fit, Velcro® loop and pile, adhesive means such as self-adhesive strips 36 having a peel ply layer 37, screws, rivets, snap-fit structures, other mating male and female structures, and the like. The left grip 31 can extend along a portion of the left side 25 of the case 2 in an area between the left shoulder 6 and back side 22 of the left handle 4, and the right grip 32 can extend along a portion of the right side 26 of the case 2 in an area between the right shoulder 7 and back side 22 of the right handle 5 in order to better fit the palm of a user's hand as desired. The left grip 31 and right grip 32 can then be customized and removably attached to best fit the hand size, comfort, and gaming preference of the user. In the top view shown in FIG. 24, the small size left grip 31S and right grip 32S can fit flush or nearly flush with the case 2, but the medium size left grip 31M and right grip 32M and also the large size left grip 31L and right grip 32L can project by different amounts from the normal profile of the case 2. Shown in FIG. 24 is a game controller 1 including small size left grip 31-S installed, and also showing a medium left grip 31-M, a large left grip 31-L, and a small right grip 32-S which are relatively symmetrical in shape, but also a medium right grip 32-MASYM and large right grip 32-LASYM which have an asymmetrical shape. In this regard, it is possible to reverse and flip the direction of the asymmetrical grips so that the thicker portion can be either placed closer to the front 21 or the back 22 of the game controller 1. Moreover, it is possible that a user may desire and choose to use one sized grip 31 having a particular symmetrical or asymmetrical configuration on the left side 25 and a different sized grip 32 on the right side 26 of the game controller 1.

Figure 25:
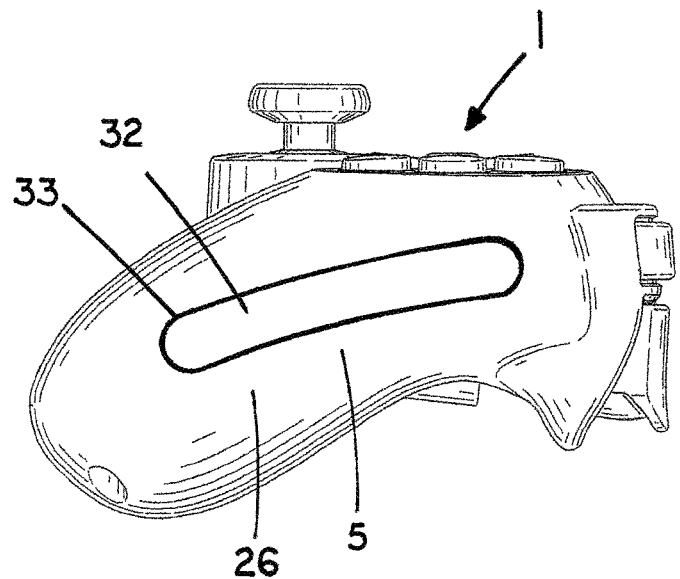
FIG. 25 is a side view of the right side of the game controller shown in FIG. 7 showing different customizable and selectively removable ergonomic grips for accommodating users having small, medium, and large hand sizes.

FIG. 25 is a right side 26 view of the game controller 1 shown in FIG. 7. As shown in FIG. 12, the right grip 32 can be customized and removably secured to the right side 26 of the right handle 5 in a location between the shoulder 7 and the back side 22 of the right handle 5. In this regard, the case 2 can include a female recess 33 for inserting a male portion 34 of the right grip 32. A male portion of the right grip 32 can then be removably friction fit and/or snap fit in place on the right side 26 of the right handle 5 to secure the right grip 32. If desired, a double sided strip of self-adhesive tape 36 having a peel ply layer 37 can also be applied to the male portion 34 of the right grip 32 in order to help secure it in place, as shown on the right side of FIG. 24. Optionally, Velcro® loop and pile, screws, rivets, mechanical snap-fit, and other mating male and female structures can be used, and the like.

Figure 26:
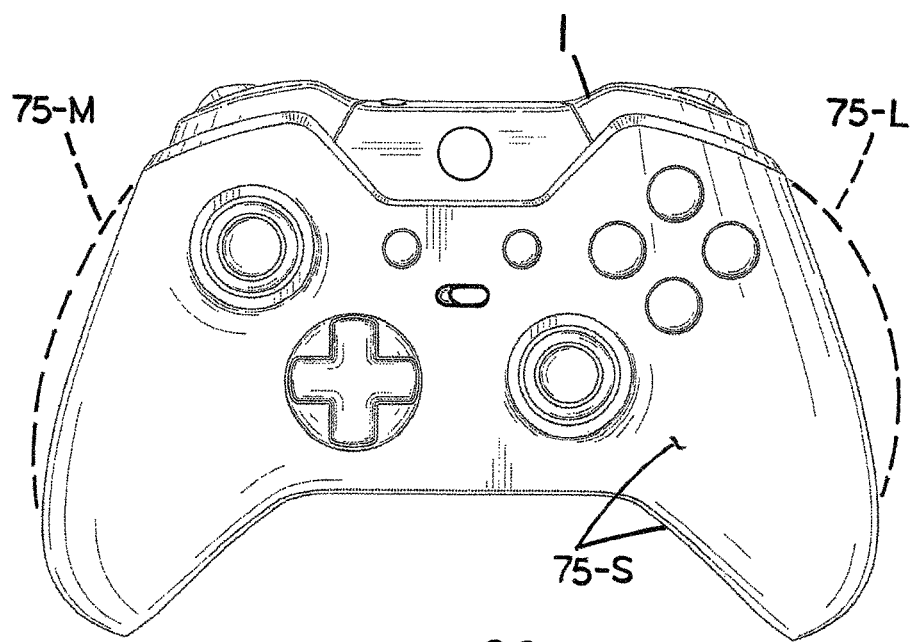
FIG. 26 is a top view of a resilient cover for use with a game controller similar to that shown in FIG. 1 which can be provided in small, medium, and large hand sizes.

FIG. 26 is a top view of a resilient stretch to fit game control cover 75 which can be made using a silicone or thermoplastic rubber material, and in ergonomic configurations to fit users having small 75S, medium 75M, and large 75L hand sizes.

Figure 27:
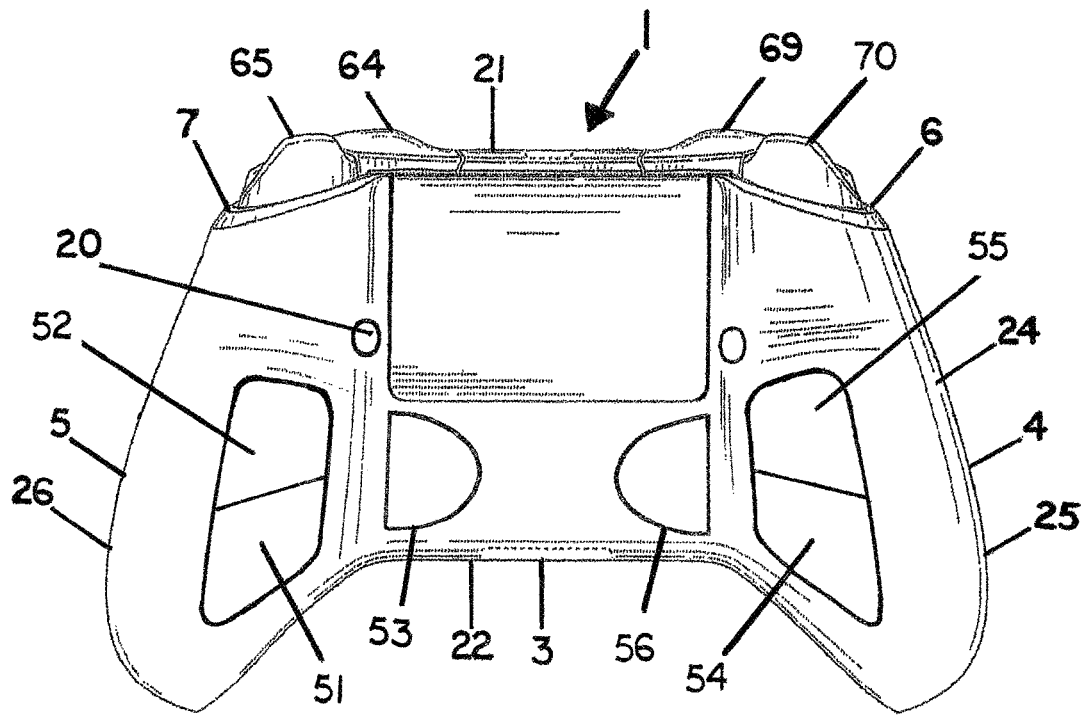
FIG. 27 is bottom view of a game controller according to one embodiment which can include controls and features resembling those shown on the top side and front side of the alternate embodiments shown in FIG. 1, but which include two keys for actuating switches generally similar to those used on mouse devices on each handle, and also two keys in the middle portion of the game controller.

FIG. 27 is bottom view of a game controller 1 according to one embodiment which can include controls and features resembling those shown on the top side 23 of the embodiment shown in FIG. 1, but instead includes on the bottom side 24 two push keys 51 and 52 on the right handle portion 5, a push key 53 on the right part of the middle portion 3, two push keys 54 and 55 on the left handle portion 4, and another push key 56 on the left part of the middle portion 3 for actuating control switches 39, and on the front side 21 near the right shoulder portion 7 includes a push right trigger key 64 and right bumper key 65, and on the front side 21 near the left shoulder portion 6 includes a push left trigger key 69 and left bumper key 70. In this regard, the control switches 39 can be push-button and similar to those which are commonly used on mouse devices. In this regard, computer mouse devices sometimes use OMRON® brand switches type DZFC-7N in 10 or 20 mm. The structure and function of the selection keys and switches used in keyboards and various mouse devices which can be suitable for use are disclosed in the following U.S. patents: U.S. Pat. No. 4,508,942 by Inaba, U.S. Pat. No. 6,313,826 B1 by Schrum et al., U.S. Pat. No. 6,135,886 by Armstrong, U.S. Pat. No. 6,256,013 B1 by Siddiqui, U.S. Pat. No. 6,933,925 B1 by Gibbons, U.S. Pat. No. 7,205,980 B2 by Maroun, U.S. Pat. No. 7,345,674 B2 by McLoone et al., U.S. Pat. No. 7,656,389 B2 by Adan et al., U.S. Pat. No. 7,939,774 B2 by Corcoran et al., U.S. Pat. No. 7,948,474 B2 by Chatterjee et al., U.S. Pat. No. 7,995,035 B2 by Wu, U.S. Pat. No. 8,547,334 B2 by Min-Liang et al., and U.S. Pat. No. 9,372,588 B2 by Dietz et al., all of these patents hereby being incorporated by reference herein. Several of these patents disclose pressure sensitive switches which can vary the electrical signal communicated during actuation depending upon the pressure being applied such as U.S. Pat. No. 6,135,886 by Armstrong, and U.S. Pat. No. 9,372,588 B2 by Dietz et al., and such can be suitable for use as desired.

Figure 28:
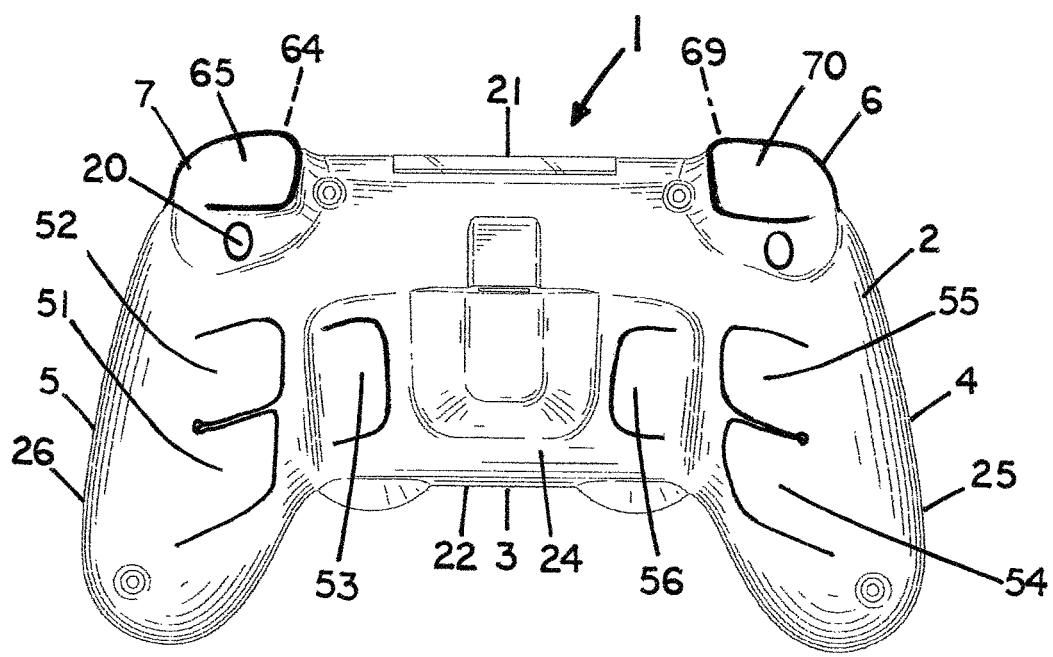
FIG. 28 is bottom view of a game controller according to one embodiment which can include controls and features resembling those shown on the top side and front side of the alternate embodiments shown in FIG. 7, but which includes two keys for actuating switches generally similar to those used on mouse devices on each handle portion, and also two keys in the middle portion of the game controller.

FIG. 28 is bottom view of a game controller 1 according to one embodiment which can include controls and features resembling those shown on the top side 23 of the embodiment shown in FIG. 7, but instead includes on the bottom side 24 two push keys 51 and 52 on the right handle portion 5, a push key 53 on the right part of the middle portion 3, two push keys 54 and 55 on the left handle portion 4, and another push key 56 on the left part of the middle portion 3 for actuating control switches 39, and on the front side 21 near the right shoulder portion 7 includes a push right trigger key 64 and right bumper key 65, and on the front side 21 near the left shoulder portion 6 includes a push left trigger key 69 and left bumper key 70. In this regard, the control switches 39 can be push-button and similar to those which are commonly used on mouse devices, as discussed above in connection with FIG. 27.

Figure 29:
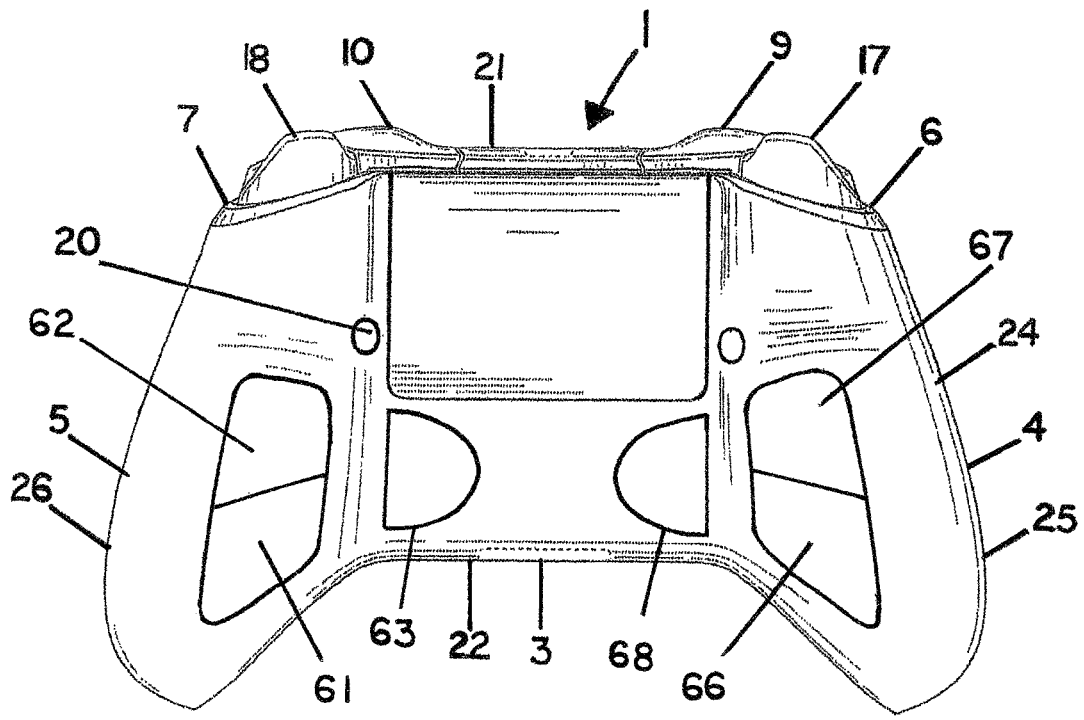
FIG. 29 is bottom view of an alternative embodiment of a game controller which can include controls and features resembling the those shown on the top side and front side of the alternate embodiments shown in FIG. 1, but which includes a plurality of touch pads on each of the left handle portion and right handle portion and also in the middle portion for actuating control of game play.

FIG. 29 is bottom view of a game controller 1 according to one embodiment which can include controls and features resembling those shown on the top side 23 and front side 21 of the embodiment shown in FIG. 1, but instead includes on the bottom side 24 two touch pads 61 and 62 on the right handle portion 5, a touch pad 63 on the right part of the middle portion 3, two touch pads 66 and 67 on the left handle portion 4, and a touch pad 68 of the left part of the middle portion 3 for actuating control of game play. In this regard, the structure and function of touch pads is disclosed in numerous patents by the Microsoft Corporation including: U.S. Pat. No. 7,659,887 B2 by Larsen et al., U.S. Pat. No. 7,813,774 B2 by Perez-Noguera, U.S. Pat. No. 7,880,727 B2 by Abanami et al., U.S. Pat. No. 8,581,852 B2 by Izadi et al., U.S. Pat. No. 8,648,822 B2 by Weiss, U.S. Pat. No. 8,665,244 B2 by Large et al., U.S. Pat. No. 8,754,855 B2 by Duncan et al., U.S. Pat. No. 8,884,907 B2 by Townsend et al., U.S. Pat. No. 8,913,019 B2 by Zhao et al., U.S. Pat. No. 8,933,912 B2 by Ambrus et al., U.S. Pat. No. 8,982,051 B2 by Rosenfeld et al., U.S. Pat. No. 9,098,117 B2 by Lutz et al., U.S. Pat. No. 9,152,288 B2 by Dietz, U.S. Pat. No. 9,174,124 B2 by Hammontree et al., U.S. Pat. No. 9,223,471 B2 by Buxton et al., U.S. Pat. No. 9,250,753 B2 by Westhues et al., U.S. Pat. No. 9,285,907 B2 by Weiss et al., U.S. Pat. No. 9,335,900 B2 by Weiss et al., U.S. Pat. No. 9,354,804 B2 by Berkes et al., U.S. Pat. No. 9,377,646 B2 by Westues et al., U.S. Pat. No. 9,436,338 B2 by Keller et al., U.S. Pat. No. 9,501,218 B2 by Hwang et al, and U.S. Pat. No. 9,519,419 B2 by Hinckley et al., all of these patents hereby being incorporated by reference herein. Within this group of patents: U.S. Pat. No. 8,913,019 B2 by Zhao et al. discloses multi-finger detection and control, U.S. Pat. No. 8,982,051 B2 by Rosenfeld et al. discloses a touch pad including multi-finger detection and control on a curved geometric feature; U.S. Pat. No. 9,377,646 B2 by Westues et al. disclosures a touch control including an oblique electrode matrix; U.S. Pat. No. 9,174,124 B2 by Hammontree et al. disclosures touch directional controls having similar function to analog joysticks; and, U.S. Pat. No. 8,581,852 B2 by Izadi et al. and U.S. Pat. No. 8,665,244 B2 by Large et al. disclose structures and methods of optical touch detection and actuation. Touch pads that work upon physical contact by a user via impedance or optical sensor(s) can be faster than mechanical switches, and also possibly more durable. Further, a game controller 1 can include a sensitivity control within its selection control and/or menu controls in order to customize and regulate the sensitivity of one or more touch pad controls.

Figure 30:
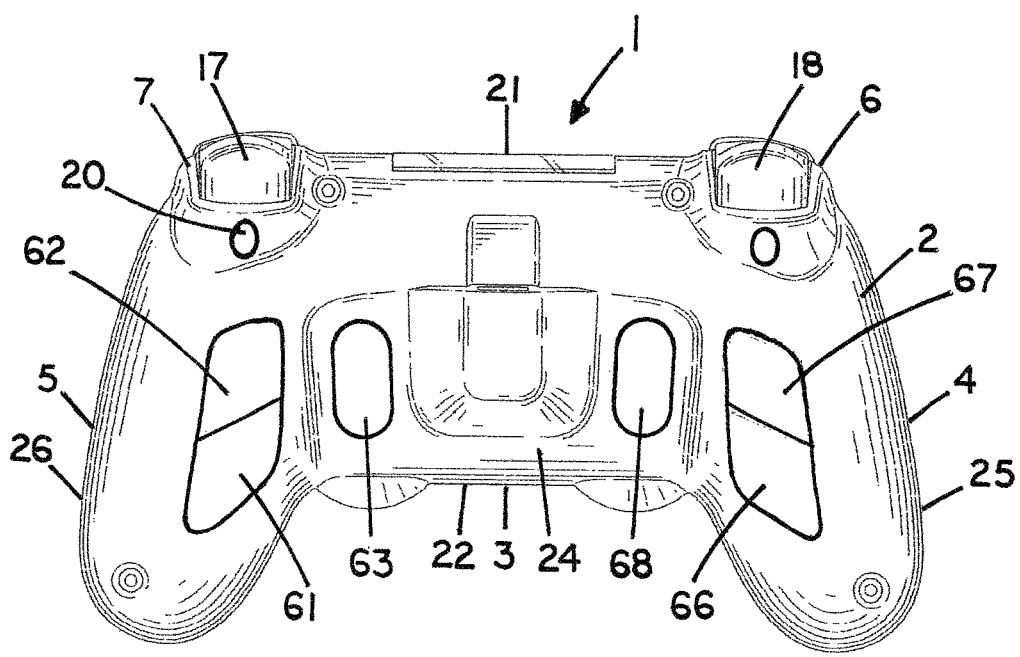
FIG. 30 is bottom view of an alternative embodiment of a game controller which can include controls and features resembling the those shown on the top side and front side of the alternate embodiments shown in FIG. 7, but which includes a plurality of touch pads on each of the left handle portion and right handle portion and also in the middle portion for actuating control of game play.

FIG. 30 is bottom view of a game controller 1 according to one embodiment which can include controls and features resembling those shown on the top side 23 and front side 21 of the embodiment shown in FIG. 7, but instead includes on the bottom side 24 a plurality of touch pads 61, 61, 63 on the right handle portion 5 and a plurality of touch pads 66, 67, and 68 on the left handle portion 4 for actuating control of game play. In this regard, at least two or three separate touch pads can be included on each of the left handle portion 4 and the right handle portion 5, as discussed above in connection with FIG. 29.

Figure 31:
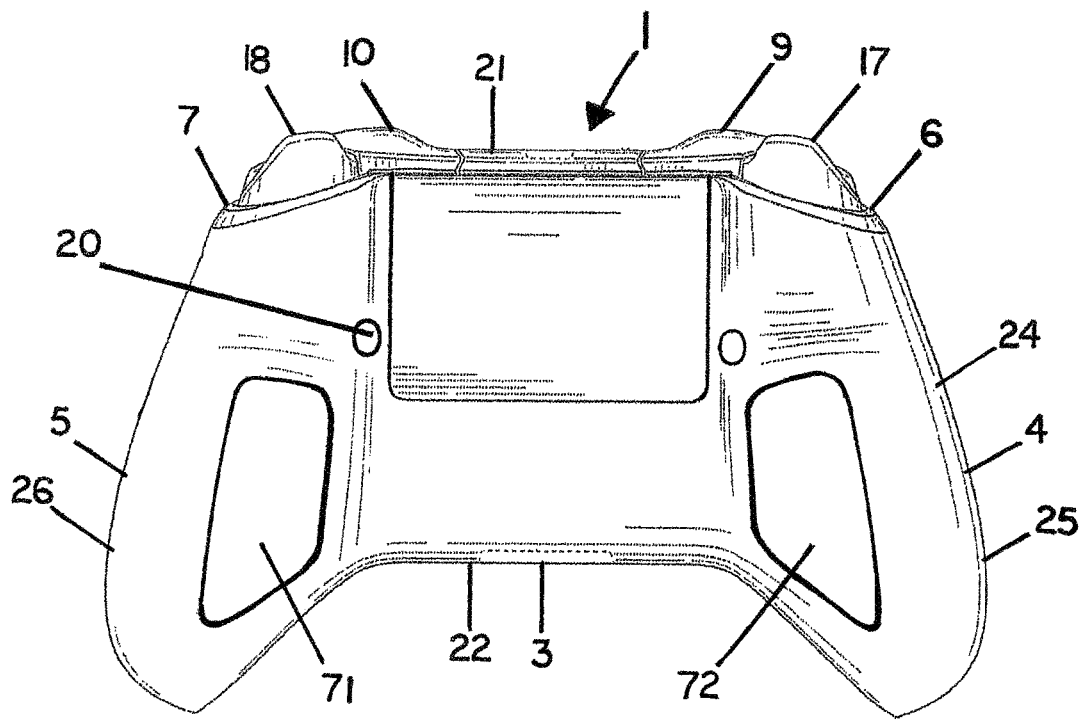
FIG. 31 is a bottom view of a game controller according to one embodiment which shows a single touch pad on the left handle portion, and a single touch pad on the right handle portion.

FIG. 31 is a bottom view of a game controller according to one embodiment which can include controls and features resembling those shown on the top side 23 and front side 21 of the embodiment shown in FIG. 1, but which instead includes a single touch pad 71 on the right handle portion 5, and a single touch pad 72 on the left handle portion 4 which each have multi-finger detection and control capability and can be mapped and selected for desired control functions and operations. Once again, U.S. Pat. No. 8,913,019 B2 by Zhao et al. discloses multi-finger detection and control, U.S. Pat. No. 8,982,051 B2 by Rosenfeld et al. discloses a touch pad including multi-finger detection and control on a curved geometric feature; U.S. Pat. No. 9,377,646 B2 by Westues et al. disclosures a touch control including an oblique electrode matrix; U.S. Pat. No. 9,174,124 B2 by Hammontree et al. disclosures touch directional controls having similar function to analog joysticks; and, U.S. Pat. No. 8,581,852 B2 by Izadi et al. and U.S. Pat. No. 8,665,244 B2 by Large et al. disclose structures and methods of optical touch detection and actuation.

Figure 32:
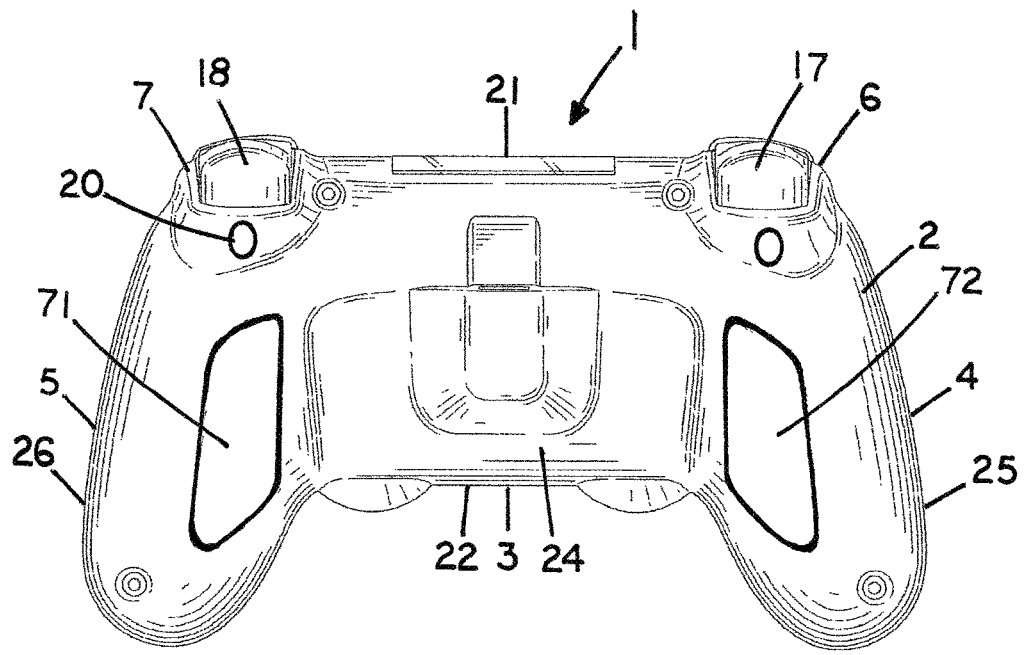
FIG. 32 is a bottom view of a game controller according to one embodiment which shows a single touch pad on the left handle portion, and a single touch pad on the right handle portion.

FIG. 32 is a bottom view of a game controller according to one embodiment which can include controls and features resembling those shown on the top side 23 and front side 21 of the embodiment shown in FIG. 7, but which instead includes a single touch pad 71 on the right handle portion 5, and a single touch pad 72 on the left handle portion 4 which each have multi-finger detection and control capability and can be mapped and selected for desired control functions and operations, as discussed above in connection with FIG. 31.

Figure 33:
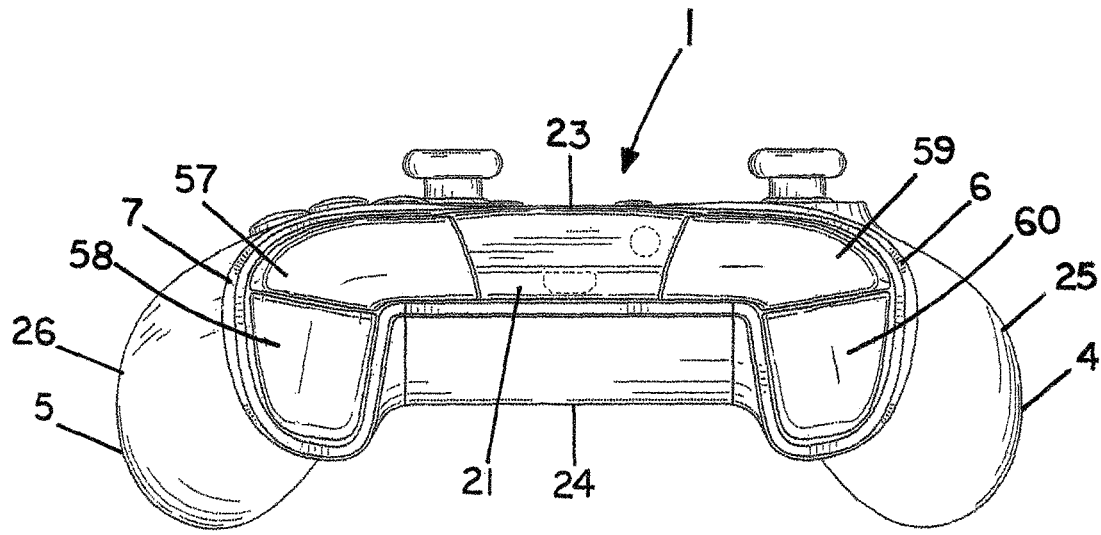
FIG. 33 is a front view of a game controller according to one embodiment including two touch pads on the right shoulder portion, and two touch pads on the left shoulder portion.

FIG. 33 is front view of a game controller 1 according to one embodiment which can include controls and features resembling those shown on the top side 23 of the embodiment shown in FIG. 1, but which instead includes a touch pad 57 and also a touch pad 58 on the on the right shoulder portion 7, and a touch pad 59 and also a touch pad 60 on the left shoulder portion 6 for actuating control of game play.

Figure 34:
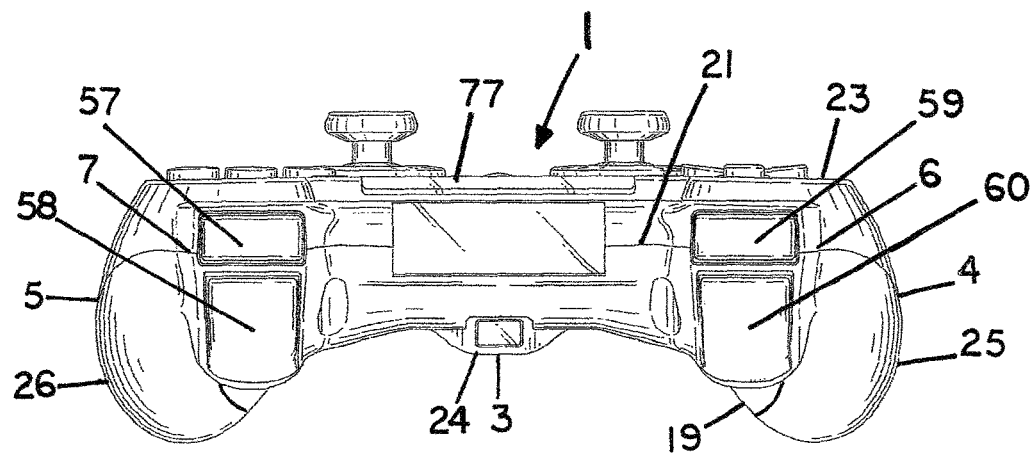
FIG. 34 is a front view of a game controller according to one embodiment including two touch pads on the right shoulder portion, and two touch pads on the left shoulder portion.

FIG. 34 is front view of a game controller 1 according to one embodiment which can include controls and features resembling those shown on the top side 23 of the embodiment shown in FIG. 7, but which instead includes a touch pad 57 and also a touch pad 58 on the on the right shoulder portion 7, and a touch pad 59 and also a touch pad 60 on the left shoulder portion 6 for actuating control of game play.

Figure 35:
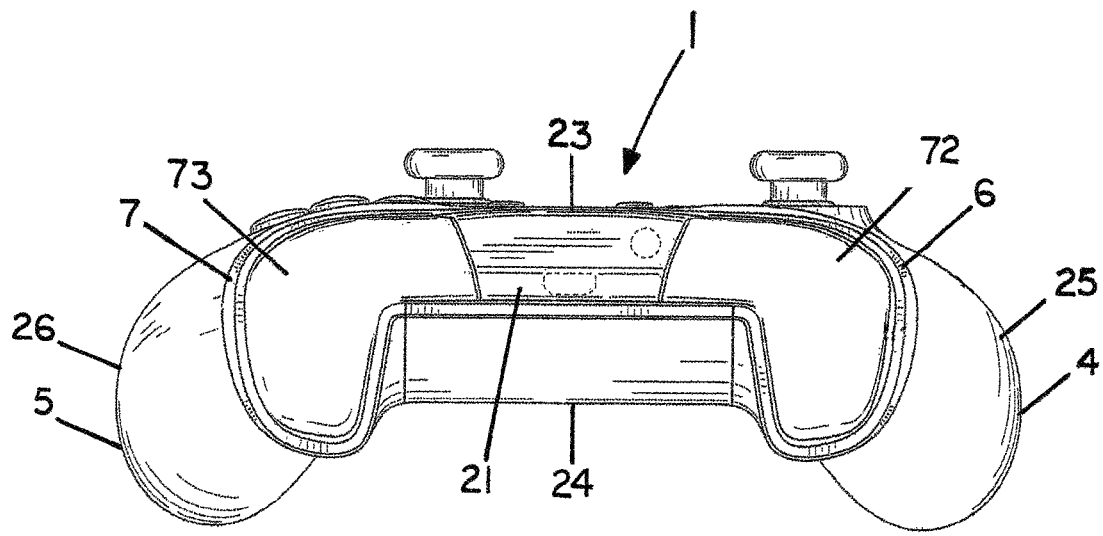
FIG. 35 is a front view of a game controller according to one embodiment generally similar to that shown in FIG. 33, but including a single touch pad on the right shoulder portion, and a single touch pad on the left shoulder portion for actuating control of game play.

FIG. 35 is front view of a game controller 1 according to one embodiment which can include controls and features resembling those shown on the top side 23 of the embodiment shown in FIG. 1, but which instead includes a single touch pad 73 on the on the right shoulder portion 7, and a single touch pad 72 on the left shoulder portion 6 for actuating control of game play. In this regard, each of the touch pads 72 and 73 can have multi-finger detection and control capability and can be mapped and selected for desired control functions and operations.

Figure 36:
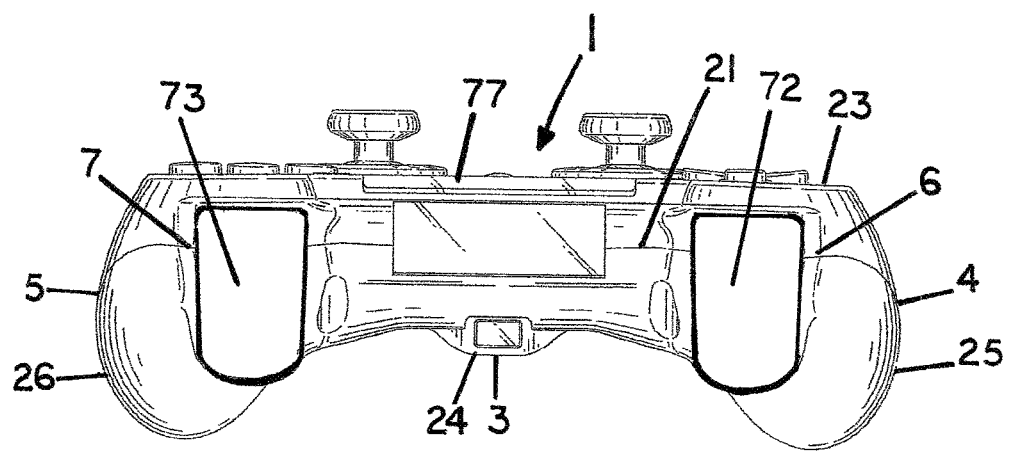
FIG. 36 is a front view of a game controller according to one embodiment generally similar to that shown in FIG. 34, but including a single touch pad on the right shoulder portion, and a single touch pad on the left shoulder portion for actuating control of game play.

FIG. 36 is front view of a game controller 1 according to one embodiment which can include controls and features resembling those shown on the top side 23 of the embodiment shown in FIG. 7, but which instead includes a single touch pad 73 on the on the right shoulder portion 7, and a single touch pad 72 on the left shoulder portion 6 for actuating control of game play. In this regard, each of the touch pads 72 and 73 can have multi-finger detection and control capability and can be mapped and selected for desired control functions and operations.

Figure 37:
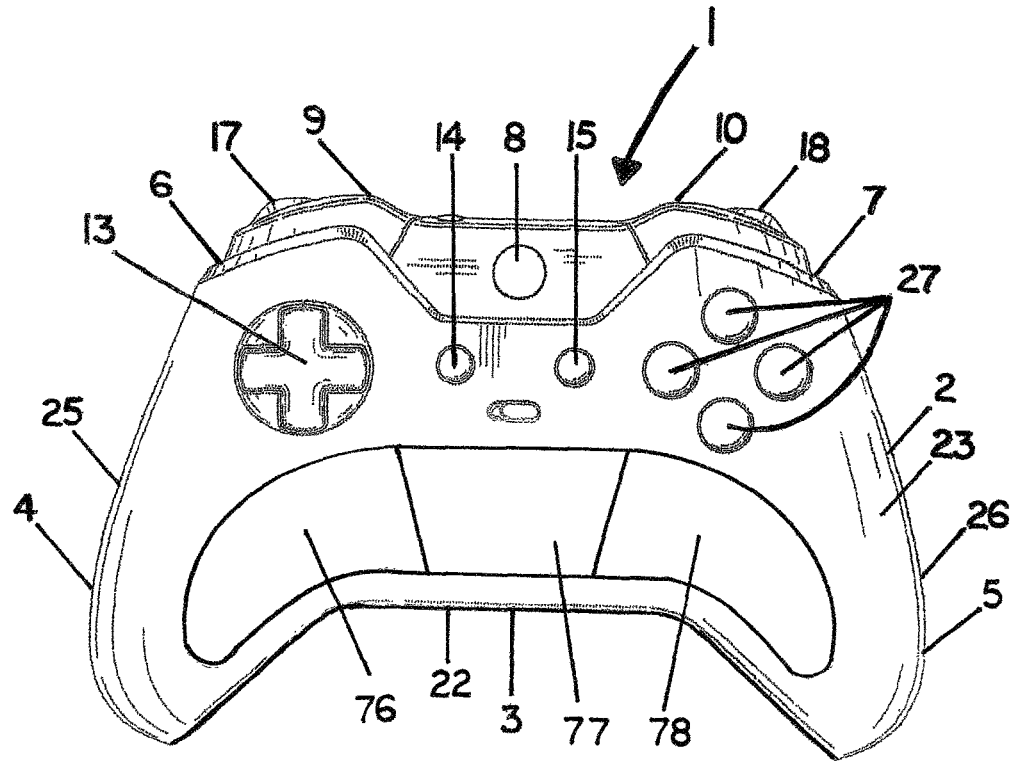
FIG. 37 is a top view of a game controller according to one embodiment including at least two touch pads and a touch screen on the top side of the game controller.

FIG. 37 is top view of a game controller 1 according to one embodiment including a left touch pad 76, a touch control screen 77, and a right touch pad 78 on the top side 23 of the game controller 1. In this regard, the left touch pad 76 can perform the functions which have been associated with game controllers having a left thumbstick control and/or directional pad control, and right touch pad 78 can perform the functions which have been associated with a right thumbstick control and/or directional pad control. The touch control screen 77 located in the middle portion 3 of the game controller 1 can include a plurality of other menu selections and controls including but not limited to a left selection control, a right selection control, a mapping control, an on and off button, action button controls such as A, B, X, and Y, and then in various possible partial combinations and permutations, or in complete combination, as desired.

Figure 38:
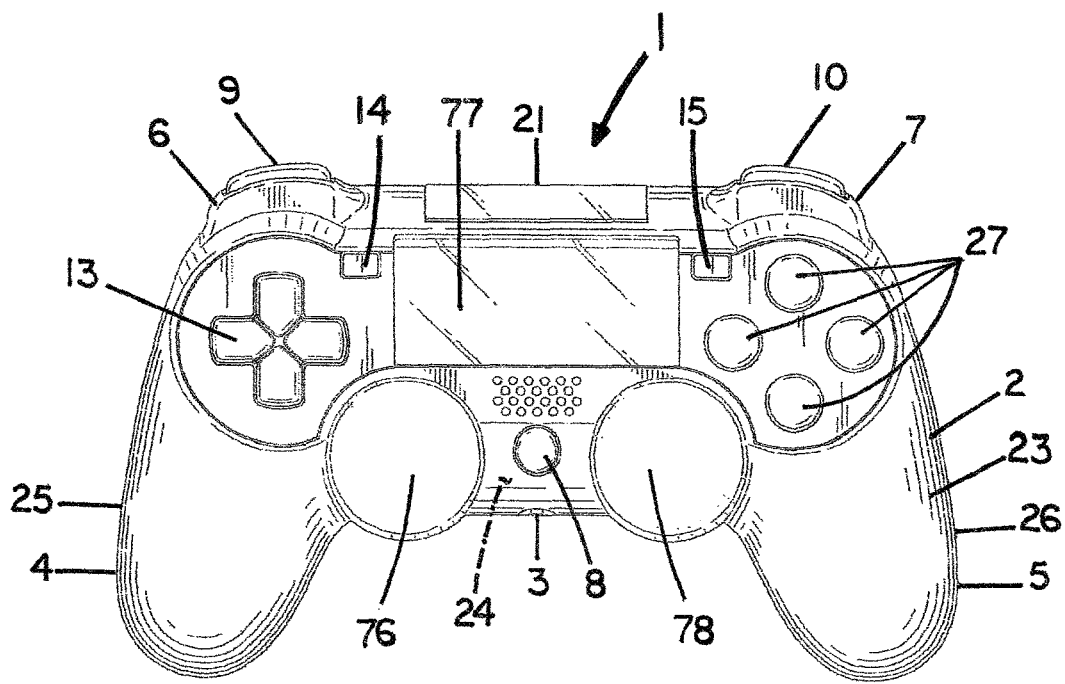
FIG. 38 is a top view of a game controller according to one embodiment including at least two touch pads and a touch screen on the top side of the game controller.

FIG. 38 is top view of a game controller 1 according to one embodiment including a left touch pad 76, a touch screen 77, and a right touch pad 78 on the top side 23 of the game controller 1. In this regard, left touch pad 76 can perform the functions which have been associated with game controllers having a left thumbstick control and/or directional pad control, and right touch pad 78 can perform the functions which have been associated with a right thumbstick control and/or directional pad control. The touch screen 77 located in the middle portion 3 of the game controller 1 can include a plurality of other menu selections and controls including but not limited to a left selection control, a right selection control, a mapping control, an on and off button, action button controls such as A, B, X, and Y, and in various possible partial combinations and permutations, or in complete combination, as desired.

Figure 39:
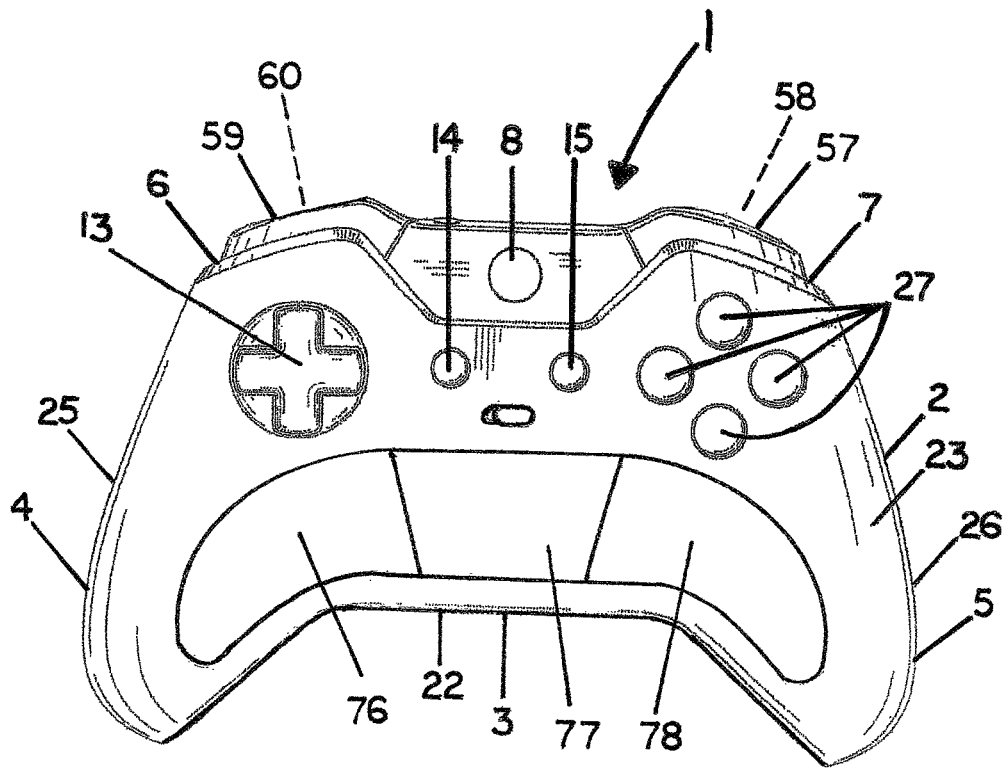
FIG. 39 is a top view a game controller according to one embodiment including at least two touch pads and a touch screen on the top side of the game controller as shown in FIG. 37, but which further includes a single touch pad on the on the right shoulder portion, and a single touch pad on the left shoulder portion as shown in FIG. 35, and also on the bottom side a single touch pad on the right handle portion, and a single touch pad on the left handle portion which have multi-finger detection and control capability and can be mapped and selected for desired control functions and operations.

FIG. 39 is a top view of a game controller 1 according to one embodiment including a left touch pad 76, a touch screen 77, and a right touch pad 78 on the top side 23 of the game controller 1 as shown in FIG. 37, and a touch pad 57 and also a touch pad 58 on the on the right shoulder portion 7, and a touch pad 59 and also a touch pad 60 on the left shoulder portion 6 as shown in FIG. 33, and on the bottom side 24 at least two of touch pads 61 and 62 on the right handle portion 5 and at least two of touch pads 66 and 67 on the left handle portion 4 for actuating control of game play as shown in FIG. 29. This alternative embodiment of a game controller 1 can provide numerous possible combinations and permutations regarding game controls and mapping options.

Figure 40:
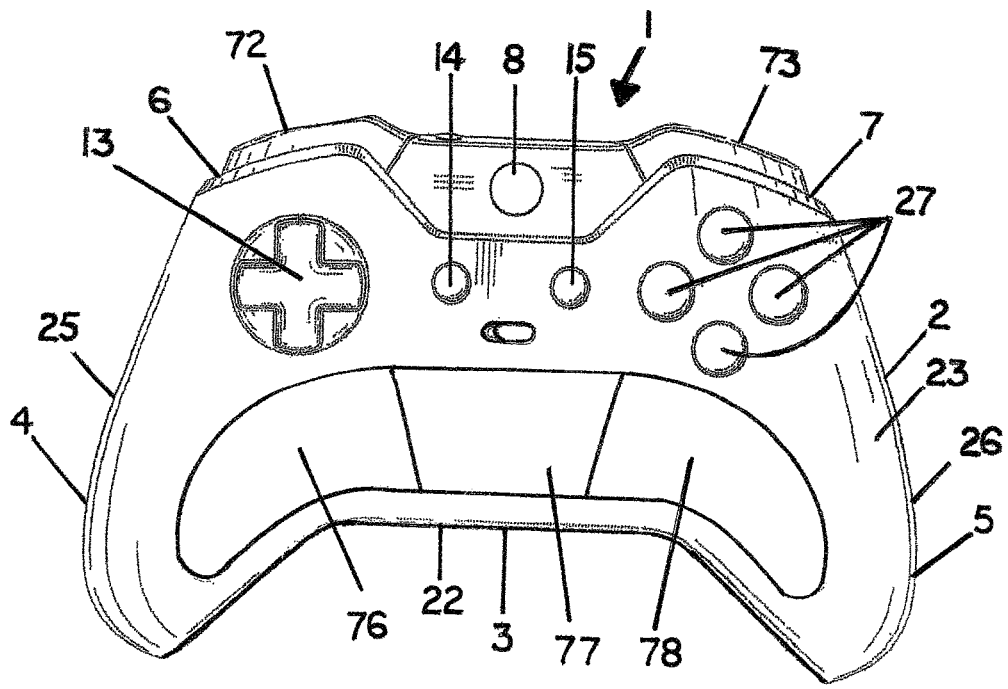
FIG. 40 is a top view of a game controller according to one embodiment including at least two touch pads and a touch screen on the top side of the game controller as shown in FIG. 37, and at least two touch pads on the on the right shoulder portion, and at least two touch pads on the left shoulder portion as shown in FIG. 33, and on the bottom side also includes at least two of touch pads on the right handle portion and at least two of touch pads on the left handle portion for actuating control of game play as shown in FIG. 29.

FIG. 40 is a top view a game controller 1 according to one embodiment including a left touch pad 76, a touch screen 77, and a right touch pad 78 on the top side 23 of the game controller 1 as shown in FIG. 37, but which further includes a single touch pad 73 on the right shoulder portion 7, and a single touch pad 72 on the left shoulder portion 6 as shown in FIG. 35, and also on the bottom side 24 a single touch pad 71 on the right handle portion 5, and a single touch pad 72 on the left handle portion 4 which each have multi-finger detection and control capability and can be mapped and selected for desired control functions and operations as shown and discussed above in connection with FIG. 31.

Figure 41:
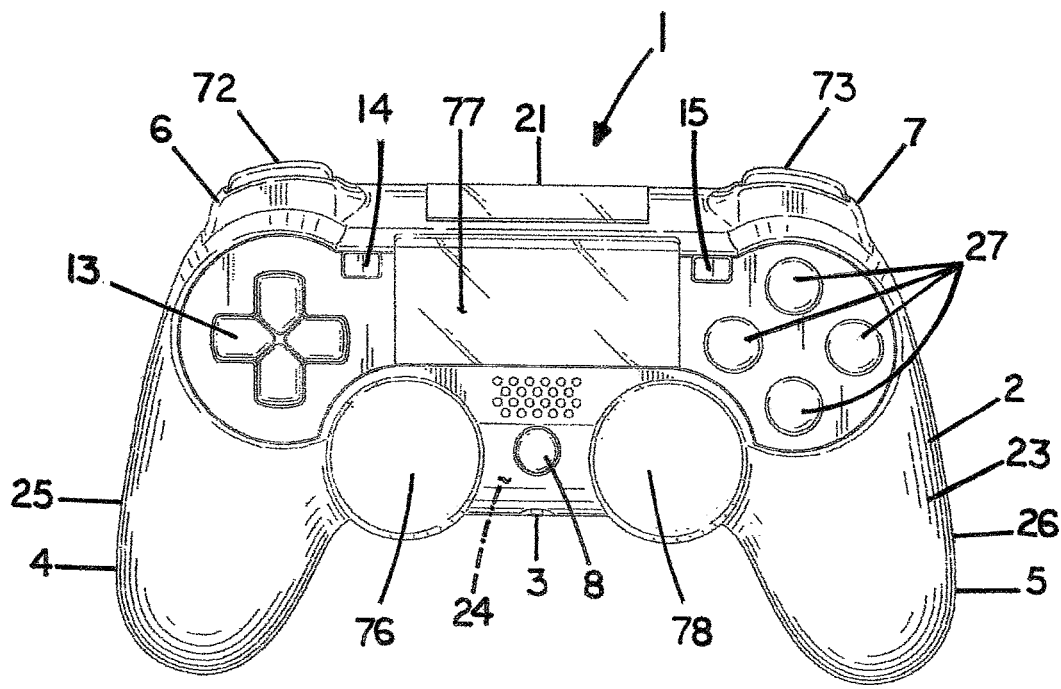
FIG. 41 is a perspective view of a game controller according to one embodiment including at least two touch pads and a touch screen on the top side of the game controller similar to that shown in FIG. 38, and further includes a single touch pad on the right shoulder portion and a single touch pad on the left shoulder portion as shown in FIG. 36, and also on the bottom side includes a single touch pad on the right handle portion, and a single touch pad on the left handle portion as shown in FIG. 32 which each have multi-finger detection and control capability and can be mapped and selected for desired control functions and operations.

FIG. 41 is a perspective view of a game controller 1 according to one embodiment including a left touch pad 76, a touch screen 77, and a right touch pad 78 on the top side 23 of the game controller 1 similar to that shown in FIG. 38, and further includes a single touch pad 73 on the right shoulder portion 7, and a single touch pad 72 on the left shoulder portion 6 as shown in FIG. 36, and on the bottom side 24 includes a single touch pad 71 on the right handle portion 5, and a single touch pad 72 on the left handle portion 4 as shown in FIG. 32 which each have multi-finger detection and control capability and can be mapped and selected for desired control functions and operations, as shown and discussed above in connection with FIG. 31.

Figure 42:
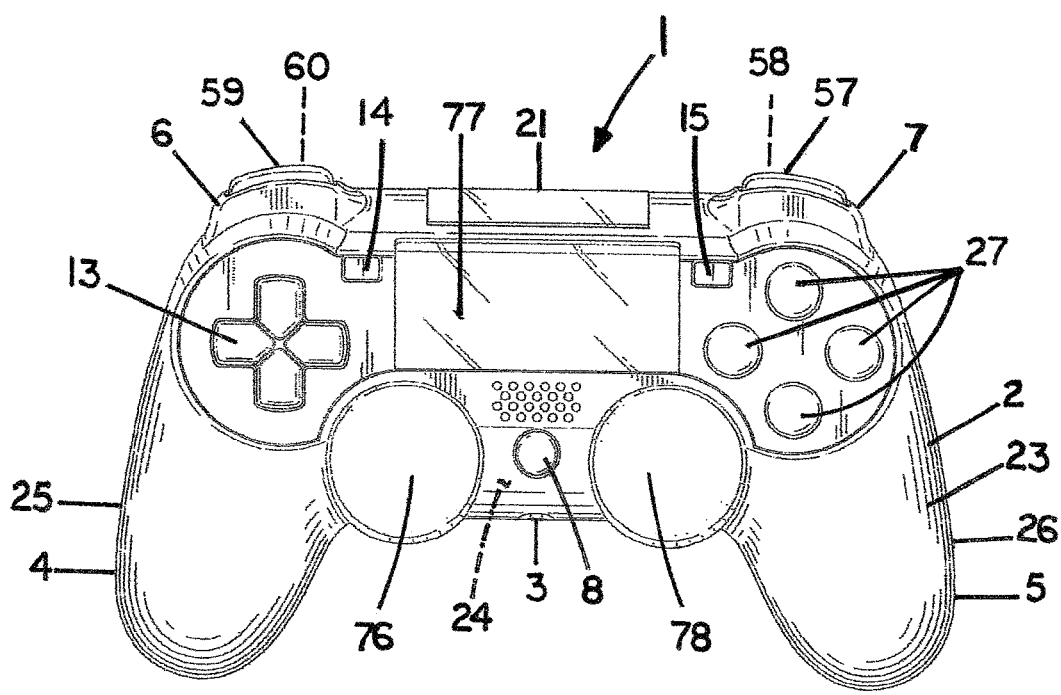
FIG. 42 is a top view of a game controller according to one embodiment including at least two touch pads and a touch screen on the top side of the game controller as shown in FIG. 38, and at least two touch pads on the right shoulder portion, and at least two touch pads on the left shoulder portion as shown in FIG. 34, and on the bottom side also includes at least two of touch pads on the right handle portion and at least two of touch pads on the left handle portion for actuating control of game play as shown in FIG. 28.

FIG. 42 is a top view of a game controller 1 according to one embodiment including a left touch pad 76, a left touch screen 77, and a right touch pad 78 on the top side 23 of the game controller 1 as shown in FIG. 38, and a touch pad 57 and also a touch pad 58 on the right shoulder portion 7, and a touch pad 69 and also a touch pad 70 on the left shoulder portion 6 as shown in FIG. 34, and on the bottom side 24 also includes at least two touch pads 61 and 62 on the right handle portion 5 and at least two of touch pads 66 and 67 on the left handle portion 4 for actuating control of game play as shown in FIG. 28. This alternative embodiment of a game controller 1 can also provide numerous possible combinations and permutations regarding game controls and mapping options.

Many other possible combinations and permutations of the structures and features which are shown and disclosed in the present application and also in the patents and patent applications which have been incorporated by reference herein are possible.

The game controllers may be coupled to a games console, computer, or games platform by a wire connection or by a wireless connection device. Further the game controllers may be coupled to a games platform online using the Internet by a wire connection or by a wireless connection device.

This disclosure may find application outside of game controllers, and may be applied to the mode of operation of other mechanical and electronic devices.

It can be readily understood that as used herein, directional references with respect to a game controller such as "top side," "bottom side," "front side," "rear side," "left side," "right side," "interior side," and "exterior side" do not necessarily limit the respective features to such orientation, but merely serve to distinguish these features from one another.

While the above detailed description of the invention contains many specificities, these should not be construed as limitations on the scope of the invention, but rather as exemplifications of several preferred embodiments thereof. Although the present invention has been described with reference to preferred embodiments, workers skilled in the art will recognize that changes may be made in form and detail without departing from the spirit and scope of the invention. In this regard, the disclosed structures and features of a game controller, and also its related functions and methods of play may be combined in various partial or complete combinations and permutations. Accordingly, the scope of the invention should be determined not by the embodiments discussed or illustrated, but by the appended claims and their legal equivalents.

What is claimed is:

1. A game controller comprising:
    a case comprising a top side, a bottom side, a front side, a rear side, a left side, a left shoulder portion, a left handle portion, a right side, a right shoulder portion, a right handle portion, and a middle portion;
    at least one control supported by the case; and
    a plurality of removable gates each including an opening having a different geometric shape for positioning about the at least one control, such that the play of said at least one control can be customized.

2. The game controller according to claim 1, wherein the at least one control comprises: at least two controls on each of said left handle portion and said right handle portion on said bottom side, wherein said at least two controls on said bottom side each comprise a touch pad control wherein said touch pad control distinguishes a touch of multiple independent fingers.

3. The game controller according to claim 2, said middle portion comprising at least two controls on said bottom side.

4. The game controller according to claim 3, wherein said at least two controls on said bottom side comprise paddle controls.

5. The game controller according to claim 3, wherein said at least two controls on said bottom side comprise push-button key controls.

6. The game controller according to claim 1, said left handle portion and said right handle portion each comprising at least one customizable and selectively removable grip portion.

7. The game controller according to claim 1, comprising at least one control switch comprising a normally closed switch which connects a first closed electrical circuit to ground in the resting position, but which breaks the connection to said ground and permits electrical energy to flow in a second closed electric circuit when said control is actuated by a user.

8. The game controller according to claim 1 wherein said at least one control comprises at least two thumbstick controls.

9. The game controller according to claim 8, said at least two thumbstick controls located on said top side of said case and arranged in a symmetrical configuration relative to said left handle portion, said middle portion, and said right handle portion.

10. The game controller according to claim 8, said at least two thumbstick controls located on said top side of said case and arranged in an asymmetrical configuration relative to said left handle portion, said middle portion, and said right handle portion.

11. The game controller according to claim 8, said at least two thumbstick controls further comprising a push button control.

12. The game controller according to claim 1, said case comprising a receptacle for receiving a retaining ring for removably securing at least one gate of said plurality of gates.

13. The game controller according to claim 1, further comprising a plurality of other additional controls selected from the group consisting of: an on/off control, a keyboard control, a master control, a menu control, a control remapping control, a camera control, a chat control, at least one shift control, at least one bumper control, at least one trigger control, at least one hair trigger lock control, at least one sensitivity control, at least one cross-shaped directional control, at least one paddle control, at least one push button control, at least one touch screen control, at least one touch pad control, at least one joystick control, at least one thumbstick control, and, at least one action button control.

14. The game controller according to claim 1, comprising means for communication with at least one of a game console and a game platform, said means for communication selected from the group consisting of: a wire connection, and a wireless connection.

15. The game controller of claim 1, wherein the opening in each of the two or more gates comprises a circular shape, an octagonal shape, a square shape or a diamond shape.

16. A game controller comprising: a case comprising a top side, a bottom side, a front side, a rear side, a left side, a left shoulder portion, a left handle portion, a right side, a right shoulder portion, a right handle portion, and a middle portion, the case comprising at least one receptacle for a thumbstick control;
- a plurality of removable gates each including an opening having a different geometric shape for positioning about said thumbstick control, such that the play of said thumbstick control can be customized;
- a retaining ring configured to be removably positioned within the receptacle to secure one of the gates within the receptacle; and
- at least two controls on each of said left handle portion and said right handle portion on said bottom side, wherein said at least two controls on said bottom side each comprise at least one touch pad control.

17. The game controller of claim 16, wherein the opening in each of the two or more gates comprises a circular shape, an octagonal shape, a square shape or a diamond shape.

\* \* \* \* \*